United States Patent [19]

Suma

[11] Patent Number: 5,130,861
[45] Date of Patent: Jul. 14, 1992

[54] METHOD AND APPARATUS FOR REPRODUCING A DIGITAL VIDEO SIGNAL

[75] Inventor: Tetsuro Suma, Kanagawa, Japan

[73] Assignee: Sony Corporation, Tokyo, Japan

[21] Appl. No.: 538,378

[22] Filed: Jun. 18, 1990

[30] Foreign Application Priority Data

Jun. 16, 1989 [JP] Japan ................... 1-154263
Jun. 16, 1989 [JP] Japan ................... 1-154264

[51] Int. Cl.$^5$ ............................................. G11B 5/09
[52] U.S. Cl. ........................................ 360/32; 358/310
[58] Field of Search ............... 358/339, 337, 343, 310; 360/32, 36.2, 33.1

[56] References Cited

U.S. PATENT DOCUMENTS 5,065,259 11/1991 Kubota et al. .................... 360/32

FOREIGN PATENT DOCUMENTS 246883 11/1987 European Pat. Off.
3718567 12/1988 Fed. Rep. of Germany.
654133 1/1986 Switzerland.

OTHER PUBLICATIONS

"Der digitale Videorecorder Entwurf des elektrischen Teils des Standards", J. Heitmann, Fernseh & Kino Technik, 41 ed., No. 1, Jan./Feb. 1987, pp. 15-22.

Primary Examiner—Vincent P. Canney
Attorney, Agent, or Firm—Alvin Sinderbrand; William S. Frommer

[57] ABSTRACT

Digital video data recorded in D-1 format, wherein the video data is recorded in successive block units with each block unit being comprised of several segments recorded in plural tracks and with each segment including unit identifying data, is recovered by scanning the tracks with plural sets of reproducing heads to reproduce plural segments concurrently from plural tracks. The unit identifying data in the segments reproduced by all of the reproducing heads in the plural sets are sensed to detect when the unit identifying data in those segments includes common unit identification, thus determining that all of the segments of a preceding block unit have been reproduced from the record medium. That preceding block unit then can be supplied in its entirety to processing or display devices, such as a television monitor.

28 Claims, 19 Drawing Sheets

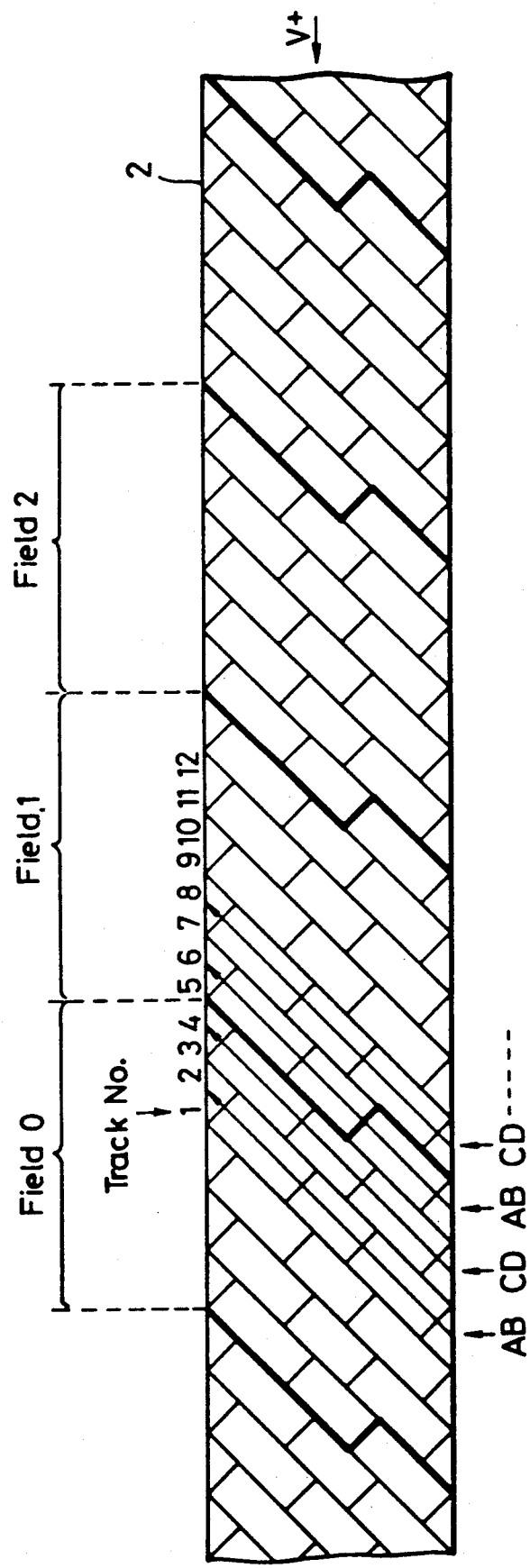
FIG. 8
FIG. 9

| | | | | | | | |
|---|---|---|---|---|---|---|---|
FIG. 12A | 2 | 1 | 2 | 1 | 0 | 1 | 0
FIG. 12B | 2 | 1 | 2 | 1 | | | 0
FIG. 12C | 2 | 1 | 2 | 1 | 0 | 1 | 0
FIG. 12D | 2 | | | 1 | 0 | 1 | 0
FIG. 12E | 2 | | | 1 | | 0 |

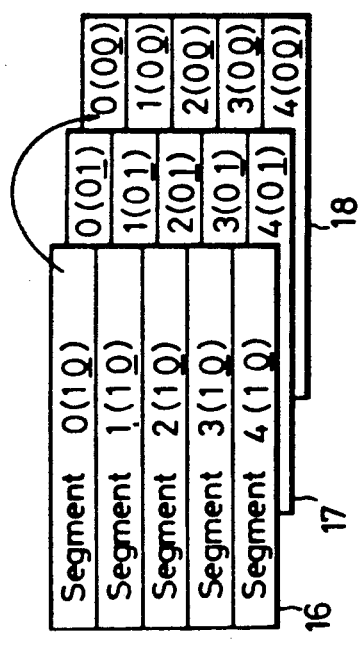
FIG. 18
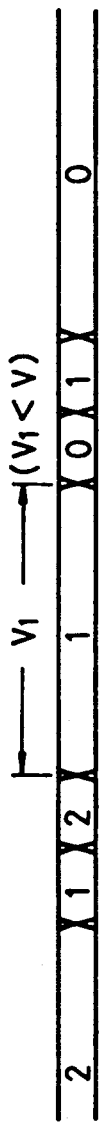
FIG. 19A
FIG. 19B
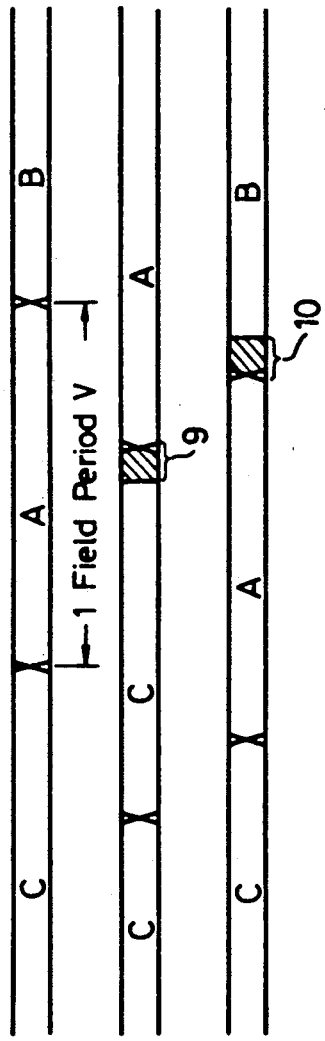
FIG. 19C
FIG. 19D
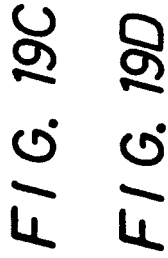
FIG. 19E

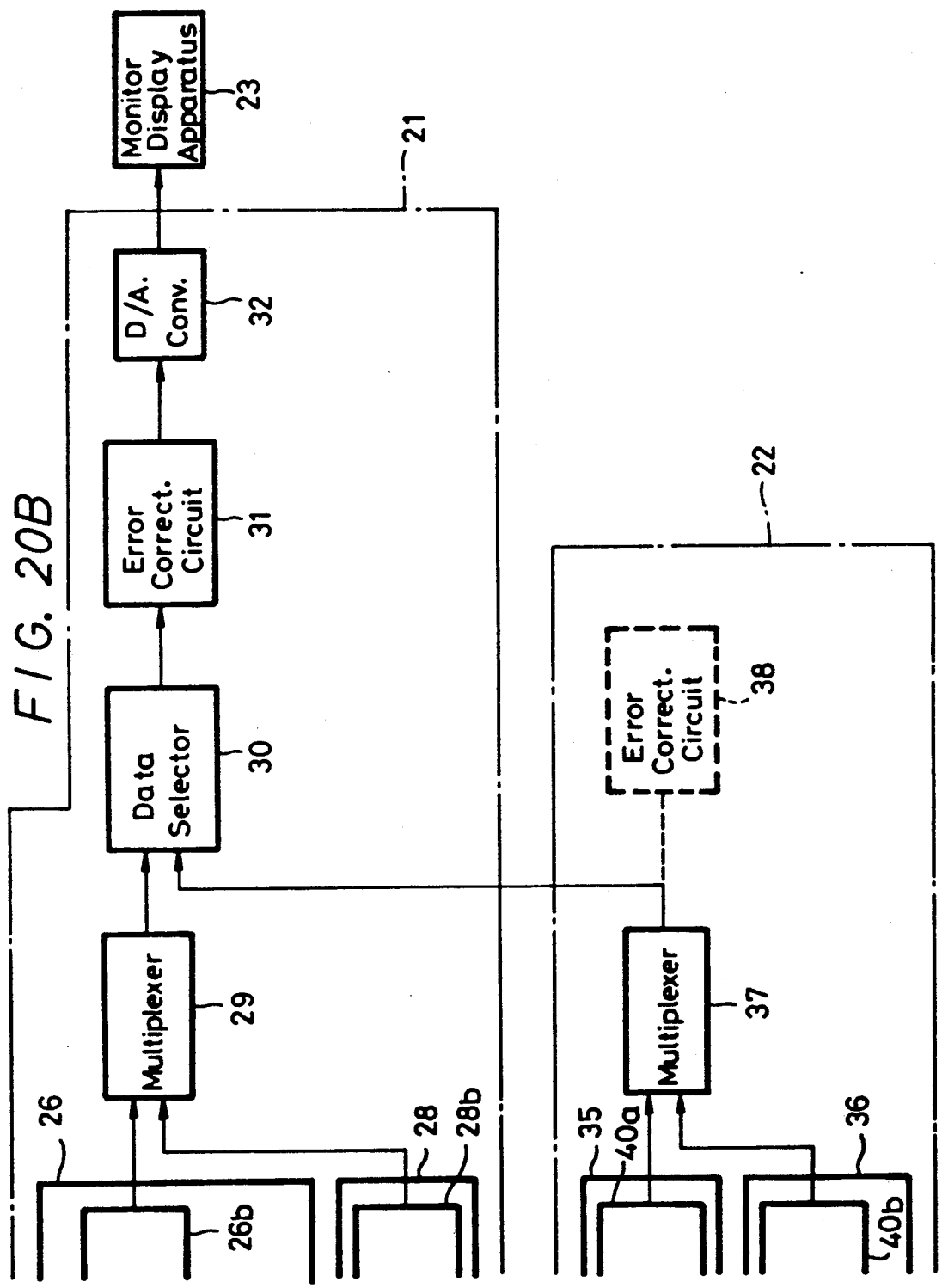

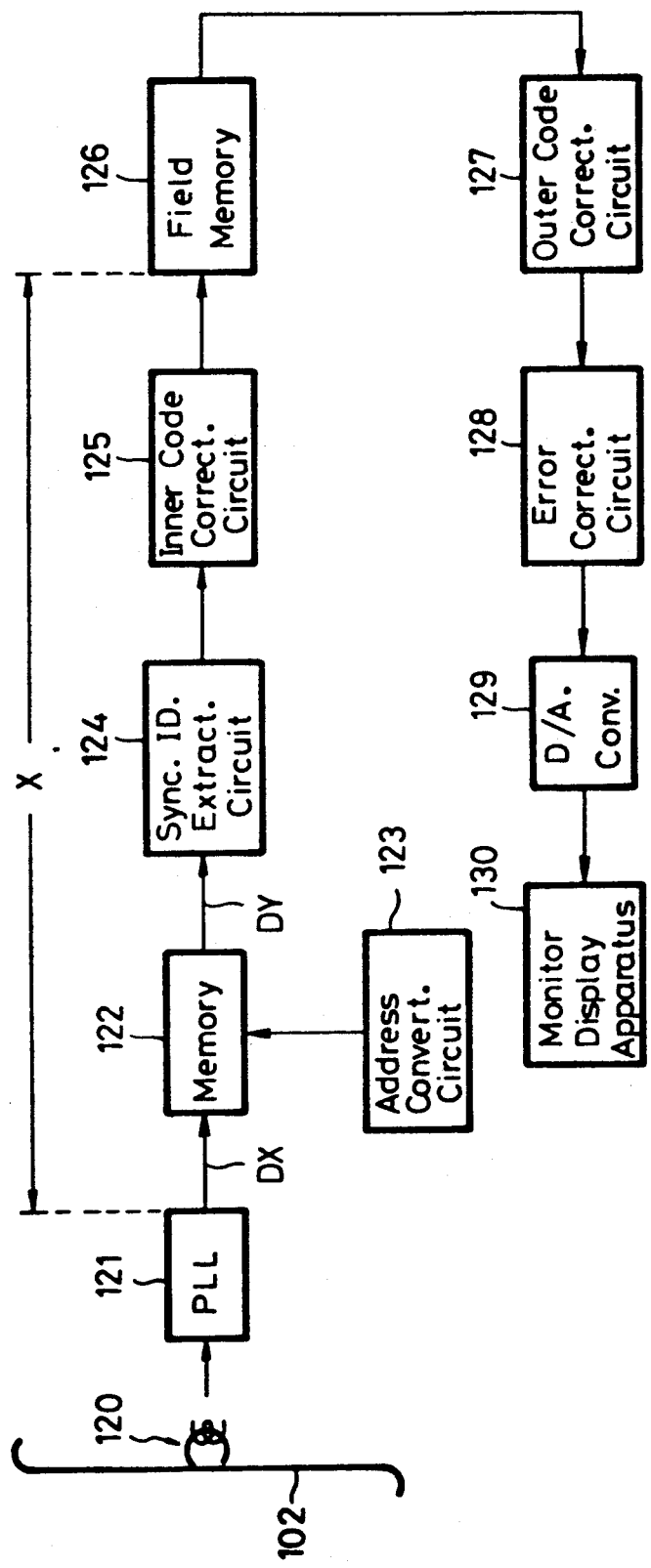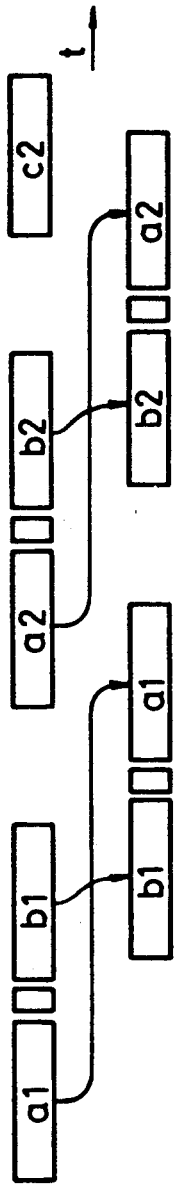
FIG. 27
FIG. 28A
FIG. 28B

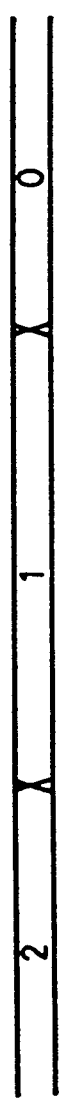
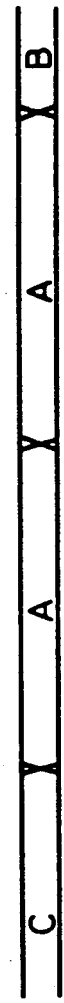
FIG. 29A
FIG. 29B
FIG. 29C
FIG. 29D
FIG. 29E
FIG. 30A
FIG. 30B
FIG. 30C
FIG. 30D
FIG. 30E

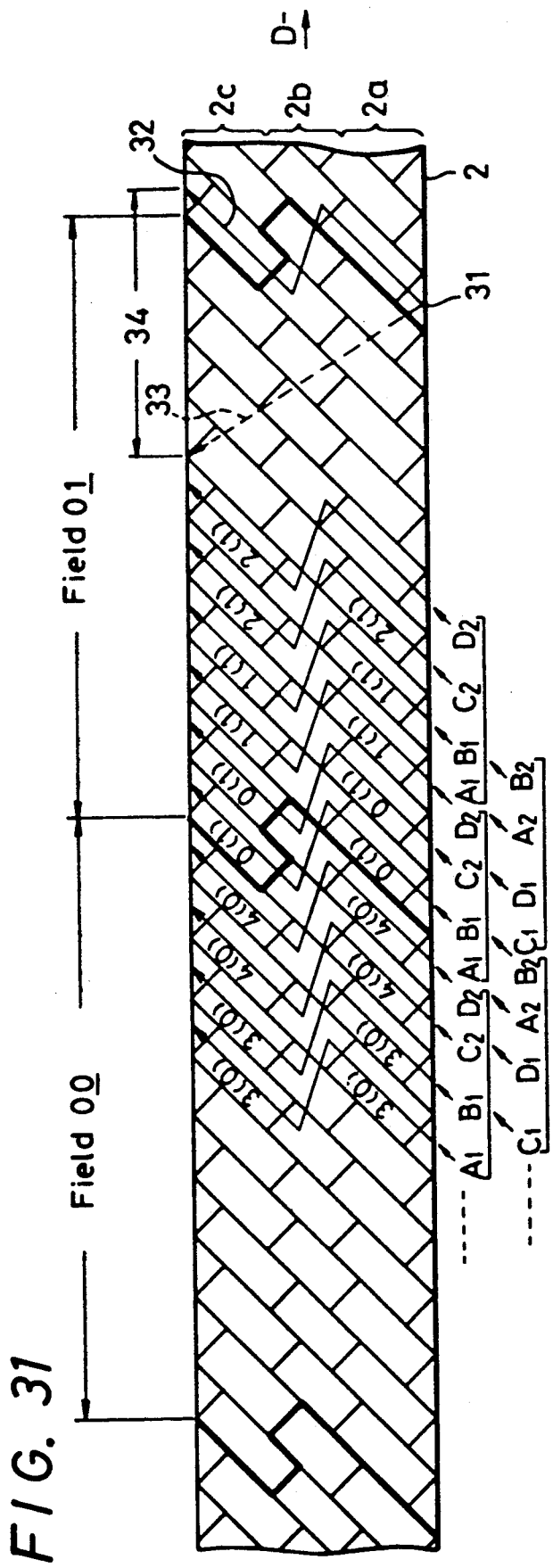

METHOD AND APPARATUS FOR REPRODUCING A DIGITAL VIDEO SIGNAL

BACKGROUND OF THE INVENTION

1. Field of the Invention

This invention relates to the reproduction of digital video data from a record medium and, more particularly, to recovering such data, which is recorded in D-1 format, with a minimal amount of memory devices but with little likelihood of distortion in the ultimately reproduced video picture due to mixing of data from different fields, even when the recorded digital video data is played back with special effects, such as reverse mode, fast forward mode, etc.

2. Description of the Prior Art

It is desirable to digitize conventional television signals in order to improve the fidelity and quality thereof, exploit special processing techniques and utilize conventional data processing circuitry and software to enhance the video picture which ultimately is reproduced. Once digitized, the video signal should be capable of recording; and digital video tape recording (DVTR) recently has been introduced. In an effort to standardize DVTR formats, a so-called 4:2:2 recording scheme has been adopted; and such 4:2:2 DVTR format also is known as the D-1 format.

Because of the enormous quantity of digital information that is produced by digitizing a conventional television signal, use of the conventional recording technique currently employed in analog video recording is not practical. That is, there simply is too much data for the recording of one complete field interval in a single track on magnetic tape. Thus, although the technique of recording slant tracks by rotating heads across magnetic tape continues to be used in digital video recording, the D-1 format contemplates the recording of one field interval in several tracks. For example, when recording an NTSC signal (also known as a 525/60 video signal because 525 lines of video information are present in each frame and 60 field intervals are produced each second), ten successive tracks are used to record a single field. If a pair of recording heads is used to record the digital video signals (as is used to record analog video signals), the heads will trace alternate tracks across the video tape, thus requiring them to rotate at extremely high speeds in order to record ten tracks in a field interval. Clearly, the mechanical and data processing speeds at which the heads and recording circuitry must operate are far too great for recording digital video signals with only two heads.

To overcome this drawback, plural tracks are recorded in parallel, as by using plural recording heads which simultaneously scan the magnetic tape. Likewise, during a playback operation, plural reproducing heads (which may differ from the recording heads) simultaneously scan the parallel tracks which were recorded. To provide accurate tracking of the playback heads during both normal and special effects modes, dynamic tracking of a type similar to that used in analog video recorders is provided. One example of a rotary head assembly proposed previously for DVTR applications and having dynamic tracking capability is illustrated in FIG. 1.

As shown in FIG. 1, a rotary drum or head wheel 1 has recording and playback heads supported thereon and is adapted to rotate such that the heads scan parallel slant tracks across a magnetic tape 2 wrapped about the drum. During a recording operation, the tape is driven in the direction $V_+$ while the drum rotates in the direction CL at a rotational speed $\omega$. Two pairs of recording heads R(A), R(B) and R(C), R(D) are mounted on drum 1, with the pairs spaced apart from each other by 180°. Preferably, separate heads are used to play back digital video signals that had been recorded previously; and two pairs of playback heads are provided P(A), P(B) and P(C), P(D), with these pairs being spaced apart by 180°. For dynamic tracking, the playback heads are mounted on movable support elements, such as bimorph elements; and, as illustrated, playback heads P(A) and P(B) are mounted on bimorph support 3, whereas playback heads P(C) and P(D) are mounted on bimorph support 4. As is known from analog dynamic tracking, the bimorph supports are movable in a direction perpendicular to the plane of the drawings so as to position the playback heads mounted thereon over the center of the tracks being scanned. For convenience, the playback heads are referred to hereafter merely as heads A, B, C and D.

The D-1 format of DVTR is described in greater detail in "Introduction to the 4:2:2 Digital Video Tape Recorder" by Stephen Gregory, Pentech Press, London, 1988, but for the purpose of understanding the problems associated with DVTR which are overcome by the present invention, a brief description of the relevant D-1 format now will be described with reference to FIG. 2A which illustrates schematically the manner in which a video field is recorded. A given slant track is divided into two video portions, each containing digital video data, these two video portions being separated by an audio portion which contains digital audio data. As shown to the right of the schematically illustrated video tape of FIG. 2A, an audio portion 2b serves to separate video portions 2a and 2c. It is preferred to position the audio portion in the vicinity of the longitudinal axis of the magnetic tape because tracking errors of the playback heads generally are minimized at that location; and errors in audio information which may be attributed to tracking errors are more perceptible than errors which may be present in the video data. Thus, to minimize a viewer's perception of interference, the audio portion 2b is disposed generally in the central portion of the tape.

An understanding of the manner in which the video data is derived and recorded in the D-1 format will best be appreciated by referring to FIG. 3 which schematically illustrates three successive video fields 5a, 5b and 5c, respectivley. For convenience, field 5a may be thought of as an even field, field 5b may be thought of as an odd field and field 5c may be thought of as an even field. Although each field in the NTSC system is comprised of 262.5 line intervals, it is appreciated that approximately 250 line intervals contain active (or useful) video information. The action portion of each field interval is divided into five segments, each segment being comprised of 50 line intervals. These five segments are identified as segments 0, 1, 2, 3 and 4. In FIG. 3, an odd field is identified with a parenthetical "1" and an even field is identified with a parenthetical "0". Thus, even field 5a is comprised of segments 0(0), 1(0), 2(0), 3(0) and 4(0) and odd field 5b is comprised of segments 0(1), 1(1), 2(1), 3(1) and 4(1).

The D-1 format records a field interval in ten tracks. Accordingly, each segment of a field is recorded in two tracks. To achieve this, each segment is divided into four sectors, identified as sectors 0, 1, 2 and 3, and two sectors are recorded in each track. To minimize gross errors that may be due to dropout or the like, adjacent sectors as well as adjacent segments are not recorded in the same track. Consequently, and as shown in FIG. 2A, the individual sectors of each individual segment are recorded in the illustrated format. It is seen that one sector is recorded in each video portion of a track and, for convenience, each video portion is illustrated with a sector number, a segment number and an indication of whether the field which contains that segment is even (0) or odd (1). Furthermore, each sector (that is, each video portion) contains, in addition to digital video data, identifying data referred to generally as identification addresses, or ID addresses formed as follows:

ID Address = [Sector No., Segment No. (Field No.)]

wherein the sector number may be from 0 to 3, the segmented number may be from 0 to 4 and the field number may be from 0 to 3. It is appreciated that the field number thus may be represented by a 2-bit signal with the least significant bit identifying the field as odd or even and with the more significant bit identifying the frame which contains that field.

A more detailed representation of the digital data which consitutes a recorded sector (or video portion) on magnetic tape 2 is illustrated in FIG. 2B. Each sector includes a preamble followed by 160 synchronizing blocks, the latter containing the digital video data. Each sector concludes with a postamble which, for simplification, is not illustrated. As shown, the preamble includes a synchronizing pattern followed by an identifying pattern and "blank" sections which are reserved for individual use. Each of the 160 synchronizing blocks is formed of a 2-byte synchronizing pattern followed by a 4-byte identifying pattern, followed by 60 data bytes, followed by a 4-byte inner code correcting pattern followed by another 60 bytes of data followed by yet another 4-byte inner code correcting pattern, and so on. Inner code error correction and outer code error correction are terms known to those of ordinary skill in DVTR and are described in the aforementioned text. Inner and outer code error correction are used to detect and correct digital errors, using conventional information theory, in the event of dropout or other distortion in the reproduced digital signals.

FIG. 2C provides an expanded representation of the 4-byte ID pattern included in each synchronizing block. It is appreciated that each sector, segment and field is identified by the ID pattern, and since 160 synchronizing blocks may be recorded, the number of the particular synchronizing block that is identified by this ID pattern also is provided. A similar format may be used when recording the digitized audio information and FIG. 2C illustrates that, in place of identifying the synchronizing block which contains video information, the ID pattern may identify the synchronizing block which contains audio information when that synchronizing block is recorded in audio portion 2b of a track.

Although FIG. 2A illustrates the D-1 recording format when used in the NTSC 525/60 system, this same format may be used in a 625/50 system, that is, a television system in which each frame interval contains 625 line intervals and 50 field intervals are produced each second. Most notable of the 625/50 system is the PAL system; and to record a PAL television signal in the D-1 format, twelve tracks are used to record a field interval, and each field is divided into six segments rather than the five segments of the NTSC system.

When the digital video tape shown in FIG. 2A is reproduced in a normal playback mode by the playback assembly shown in FIG. 1, the digital video signals generally are recovered accurately and a video picture of high fidelity is reproduced therefrom. However, some disadvantages arise when the apparatus of FIG. 1 is used to reproduce the digital video data during special effects modes. For example, let it be assumed that the digital video tape is played back at three times the normal playback speed. For convenience, this mode of operation is illustrated in FIG. 4 with tape 2 remaining stationary and the heads seemingly "moving" from left to right. (To conserve space in the drawings, FIG. 4 illustrates pairs of tracks rather than the individual tracks which have been described above in conjunction with FIG. 2A.) But for dynamic tracking, heads A(B) as well as heads C(D) would traverse the tape along the paths illustrated by the broken lines. However, because of dynamic tracking, each pair of heads is controlled to trace each track accurately, as represented by the solid lines.

Let it be assumed that heads A and B commence the scanning of tape 2 by scanning the tracks in which segment 0 is recorded. Thus, heads A(B) may be assumed to begin scanning at sectors 0,0(0) and 1,0(0), respectively (shown with these sector, segment and field numbers in FIG. 2A). Let it be further assumed that heads A(B) begin the scanning of segment 0 in field N (such as sectors 0 and 1 of segment 0). The operation of bimorph support 3 upon which heads A and B are mounted results in a deviation in the actual trace of these heads by an amount shown as arrow 6a. This deviation is equal to approximately ⅓ of a field interval. However, and as represented by arrow 6e, after fields N, N+1 and N+2 are scanned, the bimorph support produces a deviation in the actual trace of the heads equal to about 2 field intervals and, as scanning continues, the maximum deviation produced in the head trace is on the order of about 3 field intervals. It is appreciated that this mechanical deviation may present significant mechanical stresses to the bimorph elements and also to the drive apparatus when the video tape is played back at three times normal speed. Nevertheless, such a relatively high playback speed often is used for editing purposes, such as during video program production.

In addition, it is seen that a significant "jump" in the playback heads is provided from the end of field N to the beginning of field N+3. This jump along path 7 is needed for good picture reproduction when playing back the digital video tape at three times normal speed. However, during this track jump, information normally recorded in audio sector portions 8a and 8b are not reproduced. In the D-1 format, time codes are recorded in these portions. Hence, the significant track jump represented by path 7 results in a loss of time code data reproduction.

To overcome the loss of information that otherwise would be recovered from the audio sector portions when playing back the digital video tape at three times normal speed, it has been suggested that the rotary speed of head drum 1 be increased to 12/10 the normal rotary speed so that the playback heads scan twelve tracks in the same period that they would scan ten tracks (or one field) if operated at the lower, normal speed. FIG. 5 schematically represents the scanning of tape 2 by playback heads A, B, C and D rotated at 12/10 times normal speed. For example, if the normal rotary speed of the heads is on the order of about 5,000 rpm, this proposal contemplates an increase in the head speed of 20% for a 525/60 system and an increase in head speed on the order of about 16% for a 625/50 system (in the 625/50 system fourteen tracks rather than twelve tracks would be scanned). However, this increase in the rotary speed of the heads results in a durability problem and, moreover, since the head speed is to be increased only during special effects modes, and particularly during fast forward (or scan) modes, such selectivity increases the complexity of the controlling circuitry and software.

Recognizing the drawback associated with only two pairs of playback heads, such as illustrated in FIG. 1, the assignee of the present invention has proposed an improvement wherein the number of playback heads which are used to recover digital video data from the magnetic tape is increased, thereby overcoming the aforementioned disadvantages. A schematic representation of this embodiment is illustrated in FIG. 6 wherein the same recording heads R(A), R(B), R(C) and R(D) as were used in the FIG. 1 example are used herein; but the number of playback heads mounted on each bimorph element 3, 4 is doubled. Whereas the FIG. 1 example uses two sets of playback heads with each set consisting of two heads, the FIG. 6 example uses two sets of playback heads with each set consisting of four heads. Furthermore, two heads from one set are mounted on the same bimorph element with two heads from the other. As illustrated, playback heads $A_1$, $B_1$, $C_2$ and $D_2$ are mounted on bimorph element 3; and playback heads $B_2$, $A_2$, $D_1$ and $C_1$ are mounted on bimorph element 4. The reason for staggering these respective sets of playback heads will become apparent from the ensuing discussion.

It will be appreciated that heads $A_1$, $B_1$, $C_2$ and $D_2$ scan video tape 2 in parallel and concurrently; and the tape wrap angle about drum 1 is greater than the 180° separation between the two sets of heads. Hence, heads $A_1$, $B_1$, $C_2$ and $D_2$ reproduce video data concurrently with the reproduction of video data by heads $B_2$, $A_2$, $D_1$ and $C_1$. That is, both sets of heads are in magnetic contact with tape 2 at the same time. Accordingly, in a single pass, all of the playback heads play back video data simultaneously from tape 2 because one set commences its pass as the other set nears the end of its scan.

To compare the operation of the example shown in FIG. 6 with that described above in conjunction with FIG. 1, let it be assumed that the arrangement of FIG. 6 is used to play back data when the tape is driven at three times normal speed (the same playback mode that has been discussed above in conjunction with FIG. 4). Like FIG. 4, FIG. 7 illustrates pairs of tracks rather than the ten individual tracks in a field as shown in FIG. 2A. Let it be assumed that heads $A_1$ and $B_1$ commence scanning segment 0 of field N (such as sectors 0 and 1 of segment 0 in field N). At the same time, heads $C_2$ and $D_2$ are positioned at the beginning of segment 1 of field N (such as sectors 0 and 1 of segment 1, respectively). As before, but for dynamic tracking, heads $A_1$-$D_2$ would trace the path represented by the broken line in FIG. 7. However, dynamic tracking produces a deviation in the actual trace of the heads such that the heads scan the path represented by the solid line. This deviation is approximately ½ of a field interval, as represented by arrow 11a. As scanning continues, dynamic tracking produces an ever larger deviation in the scanning trace with the maximum deviation being on the order of about 1.5 field intervals. When compared to the maximum deviation of about three field intervals produced by the arrangement shown in FIG. 1 when playing back video data at three times normal speed, it is appreciated that the example shown in FIG. 6 produces a deviation that is approximately half that of the FIG. 1 example.

As a further improvement derived from the example of FIG. 6, since eight playback heads are used, about twelve tracks may be scanned during the time that the heads effect 2.5 revolutions at normal rotary speed. Consequently, these heads are able to scan the tracks of field N and then jump to the tracks of field N+3 without jumping or skipping the audio sector portion in the last track of field N or the first track of field N+3. That is, and as compared to the operation described above in conjunction with FIG. 4, information normally recorded in audio sector portions 8a and 8b are not skipped. Consequently, time code data which normally is recorded in these portions is reproduced by the example shown in FIG. 6 even when the video tape is played back at three times normal speed.

Other improvements attained by the example shown in FIG. 6 over the example shown in FIG. 1 will be observed by further comparisons of different operations of each example. For instance, if the example shown in FIG. 1 operates to play back video data from tape 2 at the forward, normal speed, the resultant playback operation is of the type shown in FIG. 8. As before, let it be assumed that the playback heads move from left to right. Initially, playback heads A and B of the example shown in FIG. 1 may be disposed at tracks 1 and 2 of field 0, whereafter heads C and D are disposed at tracks 3 and 4, and then heads A and B are disposed at tracks 5 and 6, and so on. During this normal, forward playback mode, field 0 is reproduced, followed by field 1, then field 2, and so on, as schematically represented in FIG. 9. Thus, during a normal, forward playback mode, the reproduced field increases monotonically. This, of course, is highly desirable and advantageous and simplifies the processing of the reproduced digital video data.

However, if the example shown in FIG. 1 is used to reproduce video data from tape 2 in the reverse mode, that is, at −1.0 times normal speed, the operation may be shown as schematically in FIG. 10. Here, it is assumed that heads A and B scan tracks 17 and 18 in field 2, then heads C and D scan tracks 15 and 16, then heads A and B scan tracks 13 and 14, and so on. For proper tracking, the bimorph elements are controlled to effect dynamic tracking of heads A(B) and C(D). In the absence of dynamic tracking, these heads would scan the traces represented by the broken lines in FIG. 10. However, because of dynamic tracking, the heads effectively scan the respective tracks as represented by the solid lines. It is recognized that this dynamic tracking produces deviations in the head traces as shown by arrows 6a and 6b. But, when heads C(D), for example, scan tracks 15, 16, it is seen that field 1 is played back during the first portion of this scan and then field 2 is played back. Hence, during a reverse playback operation, the reproduced fields appear as shown in FIG. 11. That is, data from field 2 is played back when heads A, B scan tracks 17, 18, then data from field 1 is played back when heads C, D begin the scanning of tracks 15, 16, but data from field 2 is played back once again when heads C, D complete the scanning of tracks 15, 16. Thereafter, data from field 1 is played back.

This non-monotonic change in the field (e. g. data from field 2, then field 1, then field 2, then field 1 is played back) as the boundary from one field to another is crossed introduces complexity in the processing of the reproduced video data. That is, there is a risk of interpreting video data during the brief reproduction of field 1 (i. e. when heads C, D are positioned at the beginning of tracks 15, 16) as being reproduced from field 2. Moreover, if tape 2 is being transported in a so-called shuttle mode, as by advancing and reversing the tape when searching for a desired location, the resultant unpredictable pattern in which the fields are reproduced adds further complications to the video data processing operation.

The difficulties and complexities associated with playing back digital video data from the video tape at $-1.0$ times normal speed is exacerbated when the tape is driven at $-0.75$ times normal speed. At this speed, the fields are not reproduced with uniform time durations. Rather, the pattern in which the fields are played back, and particularly the time duration of each field played back at $-0.75$ times normal speed may be unpredictable and may appear as shown in any one of FIGS. 12A–12E. Such unpredictability adds still further complications to the processing of the reproduced video data.

Whereas FIG. 10 illustrates the use of the example shown in FIG. 1 to play back digital video data from tape 2 at $-1.0$ speed, reference is made to FIG. 13 to explain how the example shown in FIG. 6 is used to play back video data at $-1.0$ times normal speed. In FIG. 13, the respective fields are identified by binary notation and the heads scan field 10, then field 01, then field 00, and so on. For convenience, FIG. 13 identifies each segment 0, 1, 2, 3, 4 and each field polarity 0, 1 (that is, whether the field is odd or even) in each video portion on the tape. For simplification, sector identification is not separately provided. Continuing with the convention adopted above, it is assumed that the heads are moved from right to left to effect a playback operation at $-1$ times normal speed. Let it be assumed that heads $A_1$, $B_1$, $C_2$ and $D_2$ begin scanning the video tape from sectors 4(1), 4(1), 0(0) and 0(0) at the boundary between field 10 and field 01. Assuming that heads $A_1$, $B_1$, $C_2$ and $D_2$ lead heads $C_1$, $D_1$, $A_2$ and $B_2$, then, as the first set of heads nears the end of its pass across the tape, heads $C_1$, $D_1$, $A_2$ and $B_2$ begin scanning the sectors 3(1), 3(1), 4(1) and 4(1), respectively. Thereafter, as these heads $C_1$-$B_2$ near the end of their pass across the tape, that is, as these heads approach the end of the tracks being scanned thereby, heads $A_1$-$D_2$ begin the scanning of sectors 2(1), 2(1), 3(1) and 3(1), respectively. Thus, the heads advance in the reverse direction with each pass across the tape.

FIG. 14 illustrates the sectors which are reproduced by the respective heads in the approximate time relationship at which those sectors are played back. Desirably, the digital video data played back from field to field is stored in a respective field memory for further processing. As will be described below, it often is difficult to determine when all of the segments of a given field have been reproduced and stored in the proper field memory. It also is difficult to distinguish between a segment reproduced from, for example, one even (or odd) field and a segment reproduced from the next even (or odd) field.

Whereas FIG. 14 illustrates the segments which are played back from the tape shown in FIG. 13 at $-1.0$ times normal speed, FIG. 15 schematically illustrates the segments which are played back at $-0.75$ times normal speed. Like FIG. 14, FIG. 15 represents the approximate timing relationship between sectors reproduced by heads $A_1$-$D_2$ and sectors reproduced by heads $C_1$-$B_2$. A comparison of FIGS. 14 and 15 indicates that the pattern of sector reproduction at $-0.75$ times normal speed is far more complicated than the pattern of sector reproduction at $-1.0$ times normal speed. Even though sector, segment and field identifying data are played back, it still is difficult to determine when a complete field has been recovered from the video tape. Furthermore, by reason of the D-1 format, sectors which are reproduced when the playback heads cross a field boundary must be rearranged to insure the integrity of a complete field. That is, a sector reproduced from, for example, field 10 should not be included with sectors reproduced from field 01. Assuming that the odd/even field identification bit is recovered from each played back sector, it also is important to make certain that a sector with field polarity ID bit 0 (for example) from field !0 is not included with the sectors reproduced from field 00.

The possibility of misinterpreting a sector last reproduced from, for example, an even field as being included in the next even field to be played back now will be explained in conjunction with FIGS. 16–18. In this discussion, it is assumed that digital video data is played back from the video tape at $-1.0$ times normal speed. As was discussed above in conjunction with FIG. 13, let it be assumed that heads $A_1$, $B_1$, $C_2$ and $D_2$ are positioned to begin the scanning of sectors 4(1), 4(1) of field 10 and sectors 0(0) and 0(0) of field 10, respectively. Of course, when these heads near the end of their pass heads $C_1$-$B_2$ are positioned to begin the scanning of sectors 3(1), 3(!), 4(1) and 4(1) of field 01. As the two sets of heads make successive passes across the video tape, the resultant sectors played back therefrom are as shown in FIG. 17. As before, this drawing figure represents the approximate timing relationship between the video data played back by the set of heads $A_1$-$D_2$ and the video data played back by the set of heads $C_1$-$B_2$.

Desirably, all of the sectors included in field 10 should be written into and read from a single field memory associated with this field and, similarly, all of the sectors included in field 01 should be written into and read from another field memory. Likewise, yet a third field memory should be provided for field 00. FIG. 18 illustrates field memories 16, 17 and 18 adapted to store fields 10, 01 and 00, respectively. It is important that a sector from one field not be misinterpreted as belonging to another field and thereby read into the improper field memory. Nevertheless, it is difficult, particularly during a reverse playback mode, to determine when a complete field has been fully reproduced from the video tape and stored in a field memory. For example, even when all of heads $C_1$-$B_2$ play back sectors from field 01, sectors from preceding field 10 may be reproduced thereby. This is seen when heads $A_2$ and $B_2$ complete the scanning of sectors 4(1), 4(1) in the last two tracks, respectively, in field 01, whereafter these same heads scan sectors 0(0) and 0(0) which are in the same tracks but disposed in preceding field 10.

In an effort to detect accurately when all of the sectors of a preceding field have been fully reproduced, it has been observed heretofore that when a particular head, such as head $A_1$, scans segment 2 or 3 in one field, all of the segments of a preceding field will have been played back from the video tape. This is based upon the observation that segments 2 and 3 define areas which are substantially in the central portion of a video picture, as seen in FIG. 18. Hence, by the time the central portion of the video picture is reached, it is assumed that all of the video data of the preceding field has been fully played back. Unfortunately, this is not always the case, as will now be described.

Let it be assumed that, in a reverse playback mode, a determination is made that a preceding field 10 has been fully and completely played back from the video tape by the time $t_1$ that head $A_1$ scans sector 2(1) of field 01, such as sector 12 shown in FIG. 16. Likewise, let it be determined that all of the sectors included in field 01 have been fully and completely recovered from the video tape by the time $t_5$ that head $A_1$ reaches sector 13, that is, sector 3(0), in field 00. By concluding that field 10 has been fully and completely played back at timing point $t_1$, the writing in of data into field memory 16, the field memory assigned to field 10, thus is stopped at point $t_1$. Thereafter, it simply is assumed that any subsequently reproduced sector having a field polarity identification bit "0" must be from field 00 because all of the sectors included in field 10 have been assumed to be written into field memory 16. Consequently, subsequently reproduced sectors having a "0" field polarity ID bit will be written into field memory 18. However, this means that sectors 0(0) and 0(0) which then are played back by heads $A_2$ and $B_2$, that is, sectors 14 shown in FIG. 16, are assumed improperly to be sectors from field 00. From FIG. 17, it is seen that from timing point $t_1$ to timing point $t_2$, sectors 14 from field 10 are played back by heads $A_2$ and $B_2$ and should not be stored in field memory 18, the field memory assigned to field 00. But, by reason of the technique wherein it is assumed that, at timing point $t_1$, all of the sectors included in field 10 had been fully and completely reproduced, sectors 14 are erroneously written into field memory 18 because these sectors are erroneously interpreted as being included in field 00. Consequently, a portion of the video image of the preceding field (field 10) is superimposed upon the video image of the next field (field 00) which reduces the quality of the video image that ultimately is reproduced.

Likewise, if it is assumed that at timing point $t_5$ all of the sectors included in field 01 have been fully and completely written into field memory 17, then any sector reproduced after that point with a "1" field polarity ID bit is assumed to be included in the next-following odd field (shown as field 11). However, it is seen from FIG. 17 that at timing point $t_5$, heads $C_1$-$B_2$ play back sectors 0(1), 0(1), 1(1) and 1(1) from field 01 and, subsequently, heads $C_2$ and $D_2$ play back sectors 0(1) and 0(1), respectively, also from field 01. Thus, the technique of assuming that all of the sectors included in a previous field have been fully played back when head $A_1$ plays back segment 2 or segment 3 is susceptible to error. This is because the use of two sets of four playback heads each spans a significant number of tracks in which data from different fields may be recorded. It is, of course, recognized that the difficulty in detecting when a field of digital video data has been fully and completely played back, particularly during a reverse playback mode, is due to the shuffling of sectors recorded on the video tape. Although such shuffling has been designed to minimize errors due to dropout, the reversal in fields which are played back during a reverse playback mode often results in an erroneous conclusion that a particular sector is included in the wrong field. It is recognized that relatively complicated data processing, particularly the data processing software, may be needed to minimize such errors particularly since the field identifications played back during reverse playback modes do not change monotonically.

During reverse slow motion playback modes plural field memories are used because fields of video data are written into the memories at a rate slower than the rate at which the data is read. Hence, to prevent gaps, jumps and distortion in the video picture ultimately reproduced, a field should be stored so that it may be read out more than once, if necessary. Typically, three field memories are used to provide sufficient storage capacity for reverse slow motion playback modes. However, the read/write control over these field memories is made difficult when the so-called "reverse phenomenon" is present as these fields are played back from the video tape. Such reverse phenomenon is illustrated by the playing back of one or more sectors from field 10, then one or more sectors from field 01 and then one or more sectors from field 10 once again, as shown in FIG. 17.

When digital video data is played back from a video tape by the example shown in FIG. 6 operating at −0.75 times normal speed, fields 2, 1 and 0 are recovered in the order and with the durations illustrated in FIG. 19A. It is appreciated that the reverse phenomenon occurs because multiple heads are used to play back the sectors in reverse order (that is, in an order reversed from that in which the sectors and fields were recorded). FIG. 19B shows that field 2 is stored in field memory A, field 1 is stored in field memory B and field 0 is stored in field memory C. The arrows extending between FIGS. 19A and 19B represent the writing of sectors from each played back field into a field memory assigned to that field. Once stored in a field memory, digital video data subsequently is read therefrom; and it is, of course, appreciated that video data is read from a field memory which is not then in the process of having data written thereinto.

As shown in FIG. 19C, the field memories A, B and C are read in sequence at the read-out cycle of one field period V. The read out field period V is greater than the period $V_1$ which represents the interval during which video data is written stably into a field memory. That is, period $V_1$ depicts the duration that video data is played back from the video tape and written into a field memory after the occurrence of reverse phenomenon. Once digital video data is read from a field memory, as depicted in FIG. 19C, it is converted to analog form by digital-to-analog conversion and then supplied to a suitable monitor, such as a television receiver.

FIG. 19C represents the reading out of the field memories at the field period V, corresponding to normal playback speed. However, if the playback speed is changed to −0.75 times normal speed, the change in tape speed results in playing back video data with phases that are not constant. Consequently, the phases at which the field memories are read likewise are not constant and, moreover, differ from the constant read-out phases depicted in FIG. 19C. If the write-in operation of FIG. 19B is taken as a reference, the phases at which the field memories are read when the playback speed is changed to −0.75 times normal speed are shown in FIGS. 19D and 19E. These figures indicate that the use of only three field memories to accommodate normal and special playback modes may not be sufficient. This is particularly true when address outstripping occurs, that is, when a particular field memory has data read therefrom simultaneously with the writing in of data. Such address outstripping is depicted at areas 9 and 10 of FIGS. 19D and 19E. Comparing FIGS. 19B and 19D, it is seen that digital video data is written into field memory C at the same time that data is read therefrom. Comparing FIGS. 19B and 19E, it is seen that data is written into field memory B simultaneously with the reading of data therefrom. A typical solution to this address outstripping condition simply is to provide an additional field memory. However, the use of additional memory devices is expensive and adds to the complexity of read/write control.

OBJECTS AND SUMMARY OF THE INVENTION

Therefore, it is an object of the present invention to provide an improved technique for playing back digital video data from a record medium which avoids the aforementioned drawbacks and disadvantages attending prior art techniques.

Another object of this invention is to provide a method and apparatus for determining correctly when a field of digital video data has been fully and completely played back from a record medium, even when the video data is played back in special effects modes, such as reverse or fast forward modes.

A further object of this invention is to provide a technique for playing back video data recorded in the D-1 format on a record medium wherein a sector played back from a previous field is not erroneously interpreted as being a sector included in a next-following field.

An additional object of this invention is to provide apparatus for playing back and storing digital video data recorded in D-1 format which utilizes a minimum of field memories for storing such reproduced data.

Still another object of this invention is to recover and accurately detect complete fields of digital video data recorded in D-1 format and played back by at least two sets of playback heads, with each set including more than two heads.

It is yet an additional object of this invention to detect accurately a field of digital video data played back from a record medium on which the data is recorded in D-1 format, wherein the played back data is processed easily even when the reverse phenomenon of played back fields occurs.

Various other objects, advantages and features of the present invention will become readily apparent from the ensuing detailed description, and the novel features will be particularly pointed in the appended claims.

In accordance with this invention, digital video data recorded in D-1 format, wherein each segment of a block unit of data includes ID data which identifies the block unit, is recovered by scanning the tracks in which the data is recorded with plural sets of reproducing heads to reproduce plural segments concurrently from plural tracks. The unit identifying data in the segments reproduced by all of the reproducing heads in the plural sets are sensed to detect when the unit identifying data in those segments identifies a common block unit, thus determining that all of the segments of a preceding unit have been reproduced from the record medium.

As an aspect of this invention, each block unit comprises a video field and the unit identifying data comprises field ID data such as polarity ID.

As another aspect, successive passes of the record medium are made with the plural sets of reproducing heads, and the unit identifying data reproduced by all of the heads during a common pass is sensed. Preferably, all heads are in contact with at least a portion of the medium during a pass.

As another aspect, each segment of digital video data is comprised of plural sectors recorded in different tracks with each sector containing unit identifying data and with sectors from different segments being recorded longitudinally from each other in the same track. Each played back sector is written into a memory device, and when it is determined that a complete field has been played back, the memory device into which the preceding field was written is read out. Preferably, the unit identifying data stored in a memory device is sensed to determine when another memory device into which video data was previously written has been filled.

As another feature of this invention, during a reverse playback mode, the order of the sectors which are played back from the record medium is reversed. Consequently, the inherent cause of reverse phenomenon is avoided.

As yet another feature of this invention, during a reverse playback mode, the heads do not simply scan a complete track from beginning to end. Rather, after a video sector is scanned, the heads are shifted, as by controlling the bimorph support therefor, by two tracks to continue their scanning. This too eliminates the possibility of reverse phenomenon.

BRIEF DESCRIPTION OF THE DRAWINGS

The following detailed description, given by way of example, will best be understood in conjunction with the accompanying drawings in which:

FIG. 8 is a schematic representation of the manner in which a digital video tape recorded in D-1 format is scanned at normal speed by the example shown in FIG. 1;

FIG. 9 is a schematic representation of the sequence in which the fields are played back from the video tape shown in FIG. 8 during a normal mode;

FIGS. 12A-12E are schematic representations of the sequence in which fields are played back by the example shown in FIG. 1 operated at −0.75 times normal speed;

FIG. 1 a schematic representation of individual field memories used to store respective fields of a digital video signal played back from the video tape shown in, for example, FIG. 16;

FIGS. 19A-19E are schematic representations of the manner in which three field memories are controlled for writing in and reading out video data reproduced from the video tape shown in FIG. 16 at −0.75 times normal speed;

FIGS. 20A and 20B comprise a block diagram of apparatus in accordance with one embodiment of the present invention;

FIG. 27 is a block diagram of yet another embodiment of the present invention;

FIGS. 28A-28B are schematic representations depicting a reversal in the sequence in which video sectors are played back from digital video tape and are useful in understanding the advantages derived from the embodiment shown in FIG. 27;

FIGS. 29A-29E are schematic representations of the sequence in which video fields are reproduced at −0.75 times normal speed by the embodiment shown in FIG. 27;

FIGS. 30A-30E are schematic representations of the manner in which three field memories are controlled during read-out operations when the embodiment shown in FIG. 27 is used to play back digital video tape recorded in the D-1 format;

FIG. 31 is a schematic representation of the manner in which a digital video tape recorded in D-1 format is played back in accordance with another embodiment of this invention; and FIG. 32 is a schematic representation of the video sectors which are played back in accordance with the operation depicted in FIG. 31.

DETAILED DESCRIPTION OF PREFERRED EMBODIMENTS

Figure 20A:
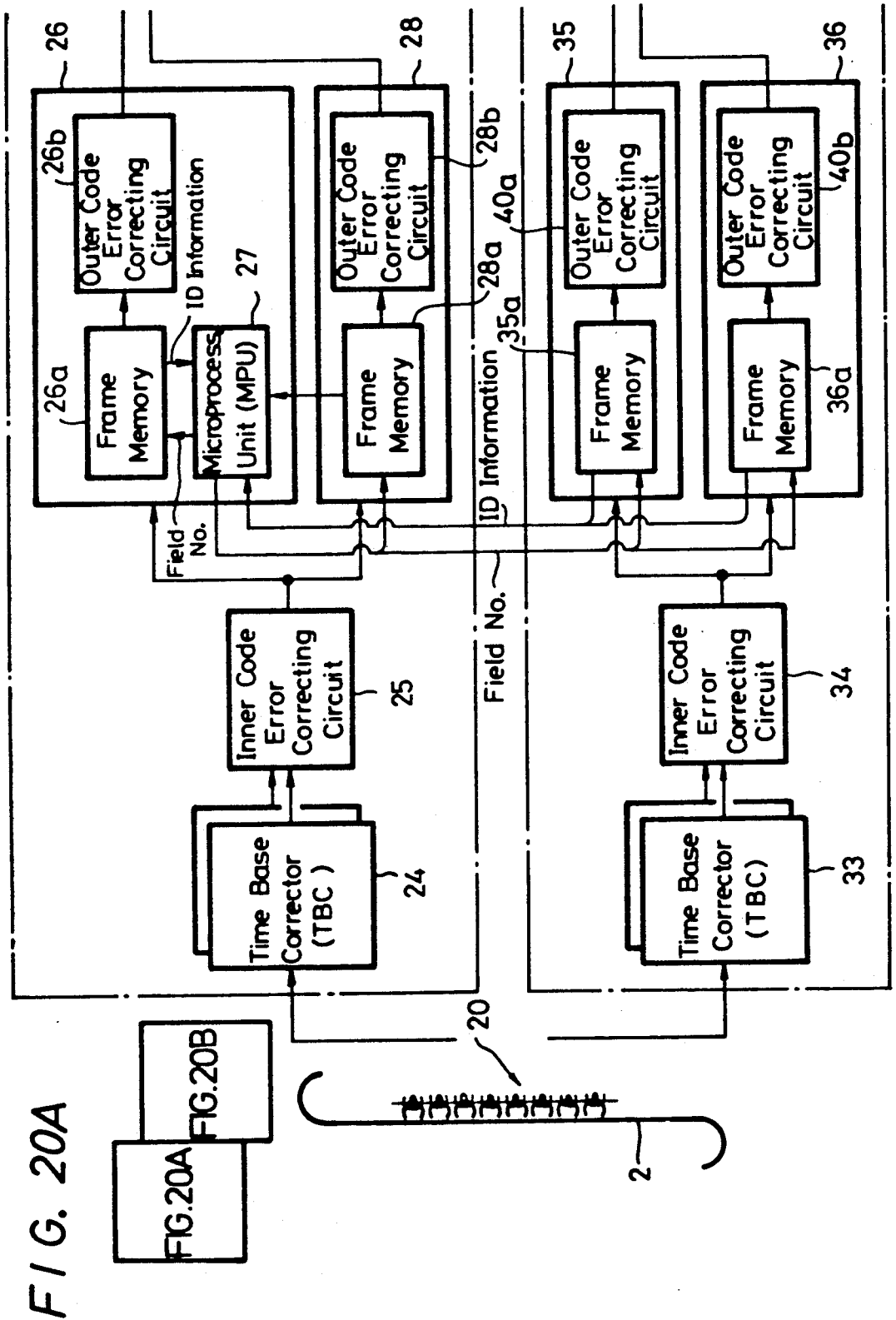

Referring now to FIGS. 20A-20B, a block diagram of a preferred embodiment of the present invention is illustrated. For convenience, this block diagram represents playback circuitry for receiving and processing the digital video signals played back from tape 2 by the head assembly illustrated in FIG. 6. The head assembly is illustrated simply as playback heads 20 and it will be appreciated that the digital video signals reproduced from the tape by one set of heads are coupled to master playback circuitry 21 and the digital video signals reproduced from the other set are coupled to slave playback circuitry 22. As will be described below, the master and slave playback circuitry are controlled by a data processor, such as a microprocessor unit (MPU) 27. For convenience, the depicted circuit in which the microprocessor is disposed is referred to as the master circuitry, thus designating the other, substantially similar circuitry as the slave circuitry.

Master circuitry 21 is adapted to receive digital video signals played back by heads $A_1$, $B_1$, $C_2$ and $D_2$ and includes timebase correctors 24, inner code error correcting circuit 25 and memory boards 26 and 28. Similarly, slave circuitry 22 is adapted to receive digital video signals played back by heads $C_1$, $D_1$, $A_2$ and $B_2$ and includes timebase correctors 33, inner code error correcting circuit 34 and memory boards 35 and 36, all illustrated in FIG. 20A. The remaining portions of the master and slave circuitry are illustrated in FIG. 20B and will be described below.

Plural timebase correctors 24 are illustrated to represent that the digital video signals played back by each head in a set is subjected to timebase correction; and these timebase correctors are coupled to inner code error correcting circuit 25. This error correcting circuit is conventional in a D-1 DVTR and is adapted to detect and correct errors that may be present in the digital video signals played back from tape 2. The error corrected digital video signals provided by inner code error correcting circuit 25 are coupled to memory boards 26 and 28 for writing into memory devices, shown as frame memories 26a and 28a. These frame memories may be comprised of random access memories (RAM's) whose read/write operations are controlled by microprocessor 27 coupled thereto. Microprocessor 27 is conventional and, as is known to those of ordinary skill in the art, may be of any several different types commercially available. In the interest of brevity, further description of the details of the microprocessor are not provided herein.

Figure 1:
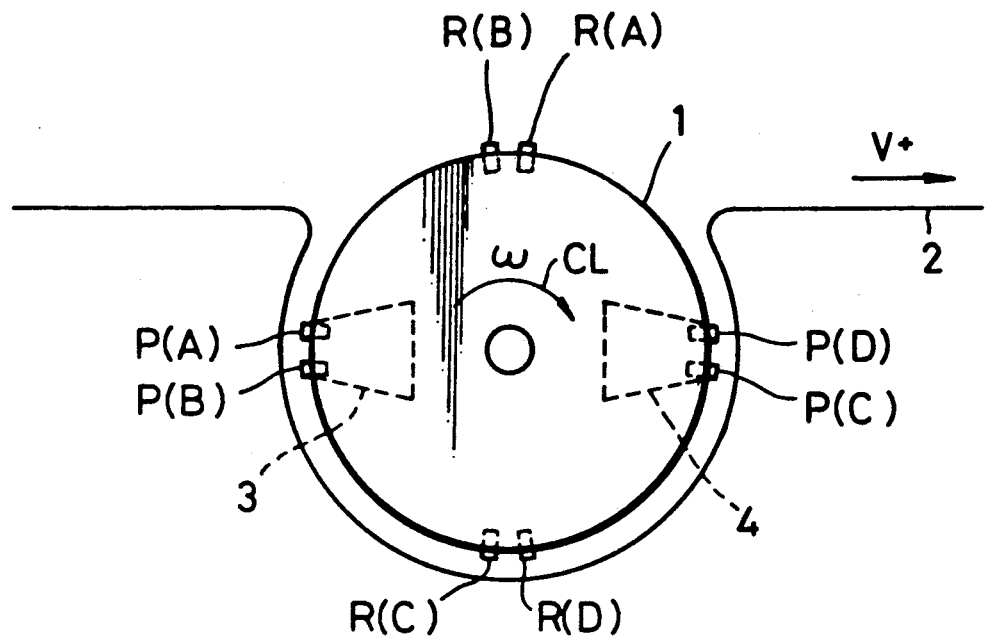
FIG. 1 is a plan schematic view of one example of a rotary head assembly capable of dynamic tracking in a DVTR.
Figure 3:
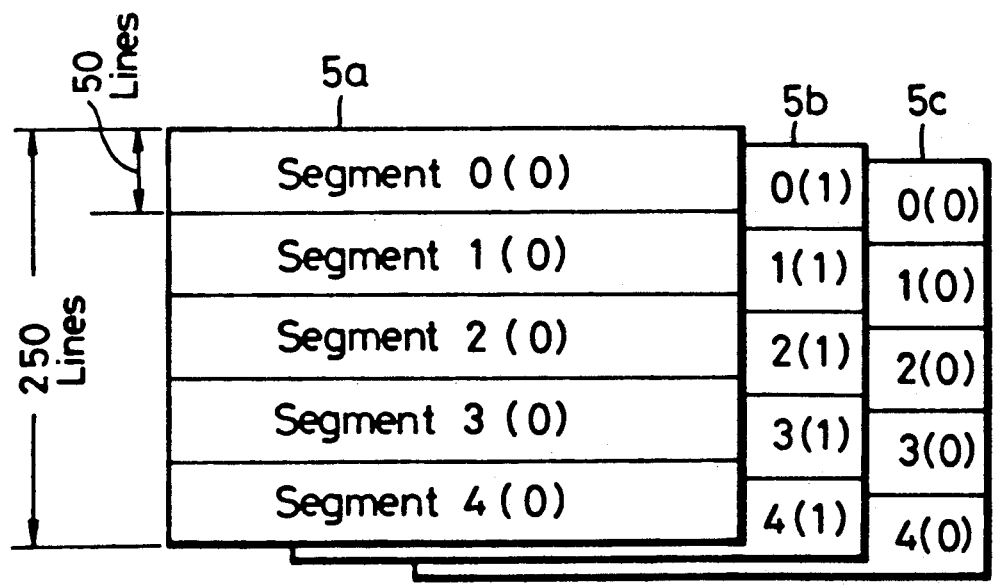
FIG. 3 is a schematic representation of segments included in video fields for recording in the D-1 format.
Figure 2A:
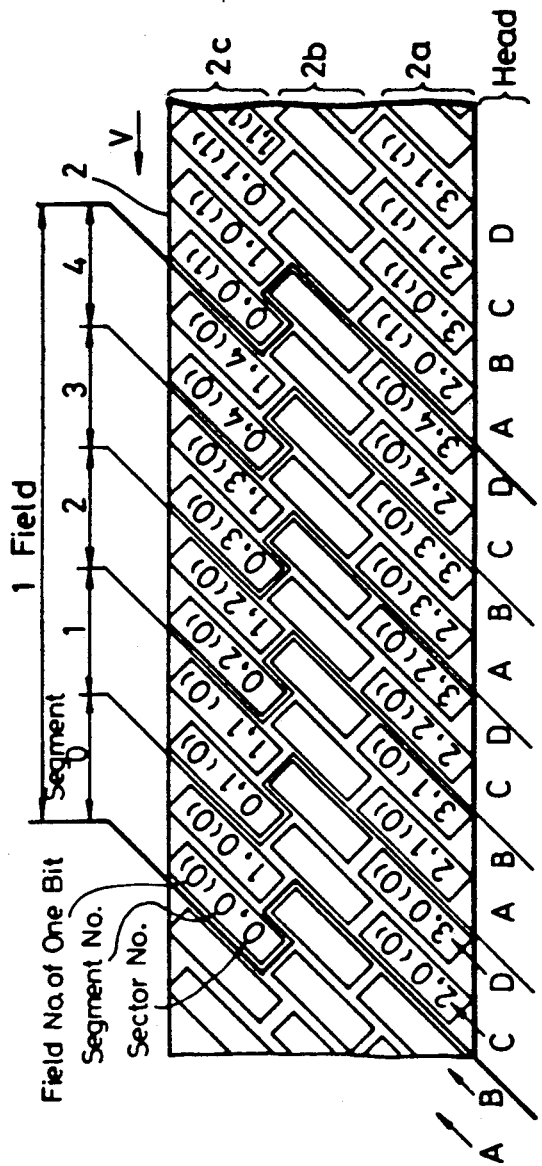
FIGS. 2A-2C are schematic representations of the D-1 format in which digital video signals are recorded.

Identifying data included in each sector of digital video signals played back from tape 2 is supplied from each frame memory to the microprocessor, whereby the sector played back from the tape may be identified. In particular, the field identifying data (referred to for simplicity as the field ID), such as that described hereinabove in conjunction with FIGS. 2A-2C, in each sector is detected by the microprocessor. Thus, at the very least, the microprocessor determines if a field of digital video data played back from tape 2 is of odd or even polarity. The microprocessor also supplies to each of frame memories 26a and 28a write and read address signals which identify the particular addresses into which a field of digital video data is to be written and from which a field is to be read. For example, if the microprocessor detects that an odd field of video data is being written into the frame memories, read-out addresses identifying the preceding even field may be supplied from the microprocessor to the frame memories to read out therefrom the previously stored even field of video data.

Frame memories 26a and 28a are coupled to outer code error correcting circuits 26b and 28b, respectively, provided on memory boards 26 and 28. The outer code error correcting circuits are adapted to detect and correct errors in the digital signals read from the frame memories. Outer code error correcting circuits are conventional in D-1 digital video recording and are described in the aforementioned text by Gregory. Accordingly, in the interest of brevity, further description of the outer code error correcting circuits is not provided. The error-corrected digital video signals produced by these outer code error correcting circuits are coupled to a multiplexer 29, shown in FIG. 20B, to be supplied to further apparatus, as will be described.

Slave circuitry 22 is similar to aforedescribed master circuitry 21 and, as illustrated, timebase correctors 33 are adapted to provide timebase correction to the digital video signals played back from tape 2 by the other set of playback heads. The timebase corrected video signals then are subjected to error detection and correction by inner code error correcting circuit 34 whereafter they are written into frame memories 35a and 36a included on memory boards 35 and 36. The identification data included in each sector, and particularly the field ID data in each sector played back from tape 2 by this set of heads, are coupled to microprocessor 27 for the purpose of identifying whether the field of video data being written into frame memories 35a and 36a is of odd or even polarity. The microprocessor produces and supplies write and read addresses to frame memories 35a and 36a to identify the particular addresses into which a played back field is written and from which a previously stored field is read out. It is appreciated that frame memories 35a and 36a may be similar to frame memories 26a and 28a and, in one embodiment, the frame memories comprise one or more RAM's. Preferably, the total storage capacity of frame memories 26a, 28a, 35a and 36a is sufficient to store three field intervals of component color video data encoded in the 4:2:2 format. In this regard, memory chips comprising a single RAM of sufficient storage capacity may be used or, alternatively, a number of individual RAM's may be suitably controlled by the microprocessor. It is appreciated that the actual physical construction of the frame memories is not critical. Rather, the write-in and read-out operations of the memory device (or devices) which constitutes the field memories (that is, the storage devices which, in combination, exhibit a storage capacity sufficient to store three field intervals of video data) are controlled by microprocessor 27 such that, once a complete field of digital video data is written into the memory, it subsequently is read out. By providing a memory device(s) with a capacity sufficient to store three fields of video data, the problem of writing data into the same memory section from which data then is being read is avoided.

Microprocessor 27 controls the write-in and read-out operations of frame memories 35a and 36a in substantially the same way as the write-in and read-out operations of frame memories 26a and 28a are controlled.

Thus, and as will be described, after the microprocessor senses that a complete field of video data has been written into frame memories 35a and 36a, that field is read out. The video data read from frame memories 35a and 36a are coupled to outer code error correcting circuits 40a and 40b, respectively, and thence to a multiplexer 37 shown in FIG. 20B. The outer code error correcting circuits included in slave circuitry 22 are similar to the outer code error correcting circuits included in master circuitry 21; and in the interest of brevity, further description of these outer code error correcting circuits is not provided. Reference is made to the aforementioned Gregory text for further explanation.

Turning to FIG. 20B, multiplexer 29, included in master circuitry 21, is coupled to a data selector 30. The multiplexer functions to select video data read from memory 26a or from memory 28a, depending upon which frame memory then is undergoing a read-out operation, to be supplied to the data selector. Similarly, multiplexer 37, included in slave circuitry 22, is adapted to supply to data selector 30 the video data being read either from frame memory 35a or from frame memory 36a. Of course, the video data supplied to the multiplexers is error corrected by the respective outer code error correcting circuits shown in FIG. 20A. Data selector 30 may be thought of as a multiplexing device and selects the output either from multiplexer 29 or from multiplexer 37 so as to reconstruct a substantially continuous line-by-line stream of digital video data.

The output of data selector 30 is coupled to an error correcting circuit 31 which is adapted to detect and correct errors in accordance with typical error correction techniques. Here too, reference is made to the aforementioned Gregory text for further description of the type of error correction that is carried out. Error correcting circuit 31 may operate on the digital video data provided by the memory boards included in both the master and slave circuitry or, alternatively, separate error correcting operations may be carried out at the outputs of multiplexers 29 and 37, respectively, as represented by error correcting circuit 38 shown in broken lines. In either embodiment, the error-corrected data that has been merged into a line-by-line stream of digital signals is supplied to a digital-to-analog (D/A) converter 32 for conversion to analog video form. The analog video signal then is supplied to a monitor 23 or other display apparatus to provide a user with a viewable video picture.

Figure 6:
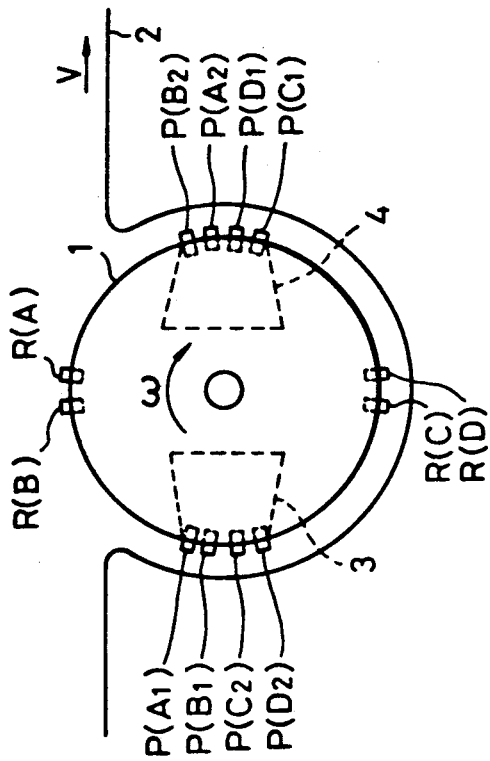
FIG. 6 is a schematic plan view of another example of a playback head assembly that can be used to play back digital video signals that are recorded in the D-1 format.
Figure 7:
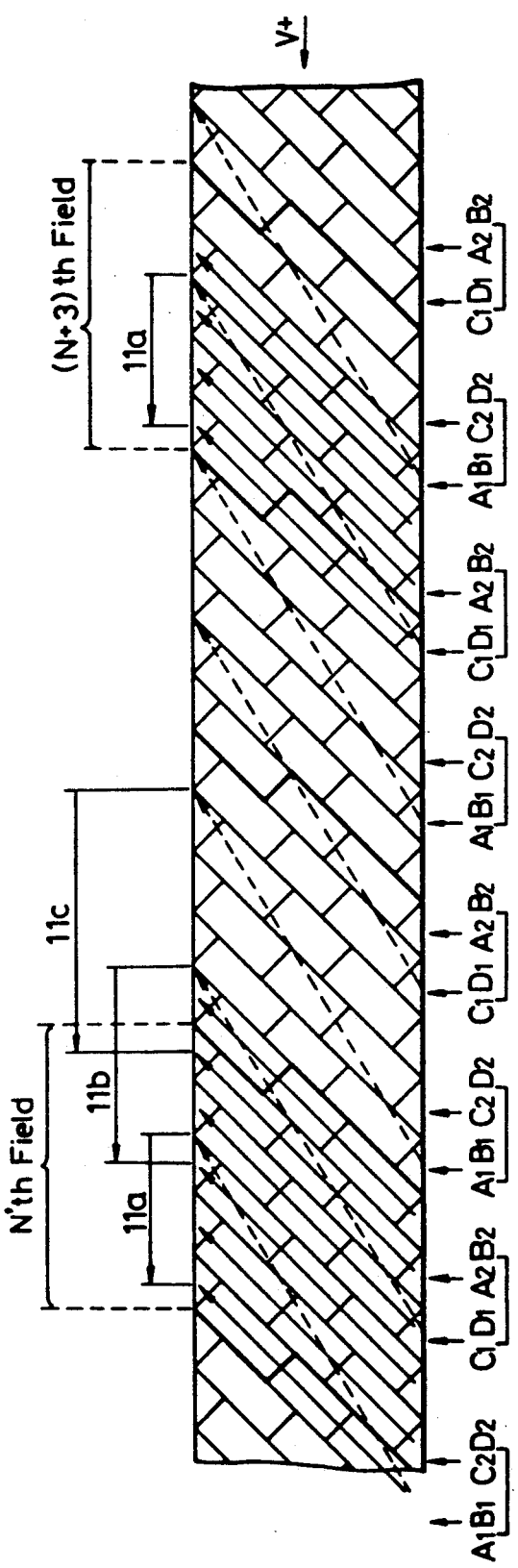
FIG. 7 is a schematic representation of the manner in which the example shown in FIG. 6 scans a digital video tape driven at three times normal speed.

In operation, if heads $A_1$, $B_1$, $C_2$ and $D_2$ of the example shown in FIG. 6 are assumed to comprise one set of playback heads and heads $C_1$, $D_1$, $A_2$ and $B_2$ are assumed to comprise the other set, during playback the digital video signals reproduced from tape 2 are timebase corrected, error corrected and then written into frame memories 26a, 28a, 35a and 36a under the write-in control of microprocessor 27. The microprocessor determines which frame memory (or section of RAM) is available for a write-in operation and then enables suitable storage locations in that section. For example, one write-in address scheme may divide the memory into field memory sections and, depending upon the field interval that is played back, the appropriate section of the memory is enabled. Moreover, since the digital video data represents individual pixels, microprocessor 27 may generate a write-in address as a function of field and pixel locations. This, of course, merely is one example of a suitable write address scheme. The particular addressing arrangement used to write and read video data may be modified, as desired, and those of ordinary skill in the art will readily envision other suitable address schemes.

Microprocessor 27 functions to determine when a complete field interval of digital video data has been written into the memory. The technique by which the microprocessor operates to detect that a complete field has been played back and written into the memory will be described hereinbelow. Once the microprocessor determines that a complete field has been stored, that field is read out, error corrected by the outer code error correcting circuits, multiplexed into a line-by-line stream of video data by multiplexer 29 and data selector 30, and then converted to analog form for display on monitor 23. It will be recognized that, in D-1 format, pixel data in respective lines are shuffled to minimize perceptible errors and noise in the displayed video picture that may be due to dropout or the like. The shuffled pixel data may be rearranged, or de-shuffled, during a memory write-in operation controlled by microprocessor 27. Alternatively, such rearrangement may be effected during memory read-out. De-shuffling is achieved simply by controlling the addresses into which the digital video data is written or the addresses from which the data is read. Preferably, the digital video data is read from the memory in a manner which restores the sectors to proper sequence.

Figure 21:
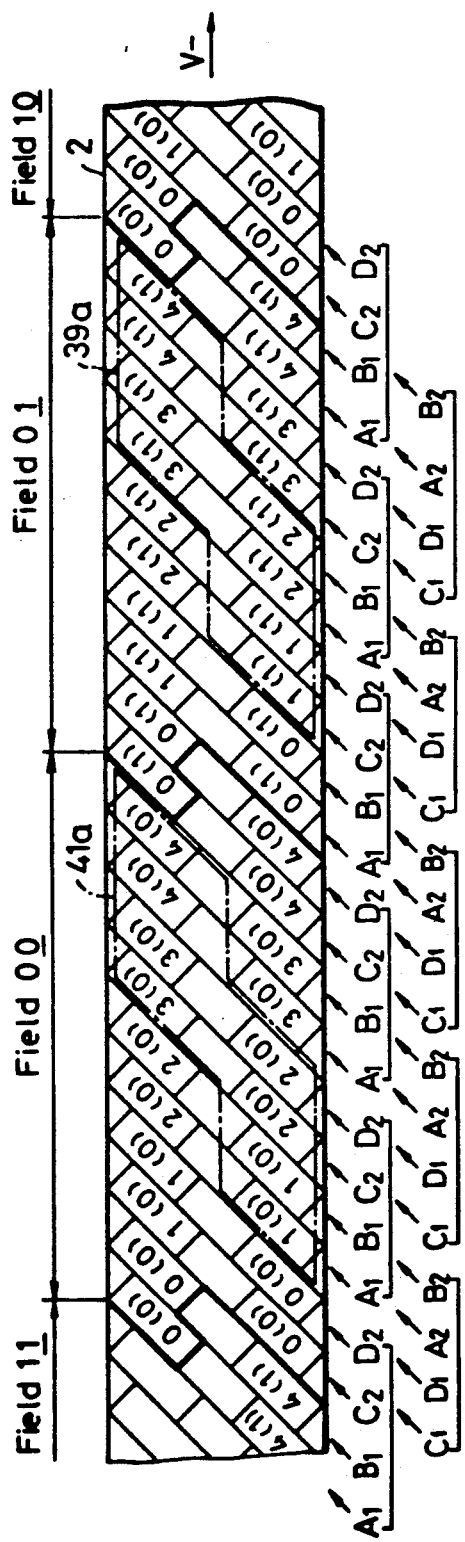
FIG. 21 is a schematic representation of digital video tape recorded in the D-1 format and played back by the embodiment shown in FIGS. 20A-20B at −1.0 times normal speed.

To appreciate the advantages achieved by the embodiment shown in FIGS. 20A-20B, and particularly when digital video data is read from tape 2 at different speeds, such as during a search mode, the playing back of data at such speeds now will be described. Initially, let it be assumed that data is played back from tape 2 at −1.0 times normal speed. Turning to FIG. 21, and assuming that heads 20 of FIG. 20A are arranged in accordance with the example shown in FIG. 6, let it be further assumed that one set of heads $A_1$, $B_1$, $C_2$ and $D_2$ initially are located at the beginning of sectors 4(1), 4(1), 0(0) and 0(0) at the boundary between even field 10 and odd field 01. For convenience, the heads are assumed to move in the right-to-left direction along tape 2. It is appreciated that, when heads $A_1$, $B_1$, $C_2$ and $D_2$ advance to sectors 0(0), 0(0), 1(0) and 1(0) in field 10, the other set of heads $C_1$, $D_1$, $A_2$ and $B_2$ rotate to scan sectors 3(1), 3(1), 4(1) and 4(1), respectively, in field 01. Of course, dynamic tracking maintains the heads positioned properly over each track.

Figure 22:
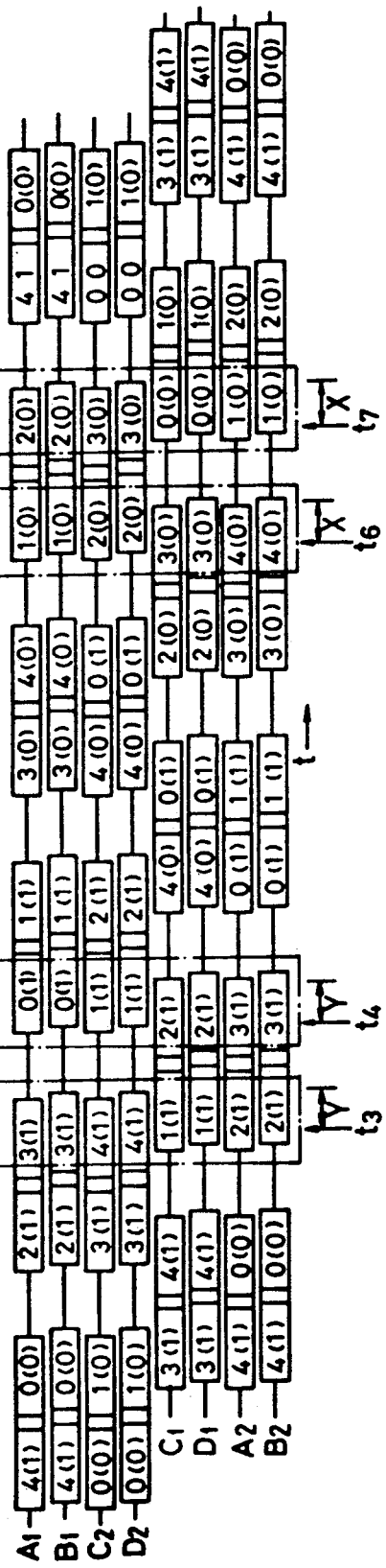
FIG. 22 is a schematic representation of the individual sectors which are played back from the video tape shown in FIG. 21 by the embodiment shown in FIGS. 20A-20B.

FIG. 22 illustrates the sectors which are reproduced by the respective heads in the approximate timing relationship at which those sectors are played back. Thus, it is seen that heads $A_1$-$D_2$ first play back sectors 4(1), 4(1), 0(0) and 0(0), respectively, and then these heads play back sectors 0(0), 0(0), 1(0) and 1(0) as the heads continue their respective traces across the tape. As these second sectors are played back, the other set of heads $C_1$-$B_2$ plays back sectors 3(1), 3(1), 4(1) and 4(1), respectively. The sectors illustrated in FIG. 22 are recovered as the heads continue their pass and as succeeding passes are made.

Microprocessor 27 controls the write-in and read-out operation of the memory such that field intervals 10, 01, 00, 11, and so on, are written sequentially and cyclically into first, second and third field memories. When all of the digital video data included in, for example, field 10 is stored in its field memory, the contents of that field memory are read out and supplied to monitor 23. Likewise, when all of the digital video data included in field 01 is stored in the second field memory, the contents of that field memory are read out to the monitor. is read out from a field memory once it is determined that the field interval has been fully and completely stored therein. As mentioned above, although three field memories are not specifically shown in FIG. 20A, frame memories 26a, 28a, 35a and 36a are controlled by microprocessor 27 so as to function as three field memories. That is, simply by controlling the write-in and read-out addresses, the frame memories may be operated as field memories.

From FIG. 22, it is seen that, when all of the sectors simultaneously played back by all of the heads contain field ID data representing the same field polarity, all of the digital video data included in the preceding field will have been fully played back from the tape and stored in a field memory. For example, as video data is written into the memory comprised of frame memories 26a, 28a, 35a and 36a, microprocessor 27 detects the least significant bit of the field ID data in each sector. As represented by the timing relationship shown in FIG. 22, all of the playback heads are in magnetic contact with tape 2 at some time during each pass of those heads across the tape. Thus, during each pass, eight sectors are played back simultaneously from the tape (although it is recognized that the heads do not reach the very same location in each sector all at the same time). Reference numeral 39 in FIG. 22 represents the condition at which the field polarity ID bit in all of the sectors simultaneously played back by all of the heads is a "1". Condition 39 corresponds to head position 39a shown in FIG. 21 whereat heads $A_1$-$D_2$ play back sectors 3(1), 3(1), 4(1) and 4(1) while, simultaneously, heads $C_1$-$B_2$ play back sectors 1(1), 1(1), 2(1) and 2(1) of field 01. In the preferred embodiment, these sectors are in the process of being (or have just been) written into the frame memories and the polarity ID bits are supplied therefrom to microprocessor 27. In an alternative embodiment, the microprocessor senses these bits as the video data is being supplied to the frame memories for a write-in operation. In any event, at the time that all of the playback heads reproduce sectors whose field polarity ID bit is the same, the preceding field will have been fully written into and stored in the frame memories. More particularly, at timing point $t_3$ of condition 39, the digital video data included in field O1 is being played back from tape 2. At that time, all of the sectors included in preceding field 10 (which field exhibits a polarity opposite that of the field now being played back) will have been stored in the frame memories. Thus, when microprocessor 27 detects condition 9 it supplies read-out addresses which serve to read from the frame memories all of the digital video data that had been written thereinto from the preceding field, that is, from the field whose field polarity ID bit is "0". Stated otherwise, it is known that when the field polarity ID bit of all of the simultaneously played back sectors is "1", all of the sectors included in the preceding field whose field polarity ID bit is "0" had been completely stored in the frame memories and thus may be read out without loss of any sector. Accordingly, when condition 39 is detected, field 10 is read out and supplied to monitor 23.

Likewise, at timing point $t_6$ when the microprocessor detects all of the field polarity ID bits in the sectors then being played back simultaneously from tape 2 are "0", such as indicated by condition 41 in FIG. 22 (which corresponds to head position 41a in FIG. 21), it is concluded that all of the sectors included in the preceding field of opposite polarity, that is, all of the sectors included in field 01, have been completely played back and stored in the frame memories. Consequently, when microprocessor 27 detects condition 41, it is determined that all of the sectors of preceding field 01 have been completely recovered from tape 2, are stored in the frame memories and may be read from the frame memories to monitor 23.

From FIG. 22, it is seen that at timing point $t_4$, a condition 40 similar to condition 39 occurs. This condition 40 may be neglected because it provides no additional information. That is, by the time condition 39 is detected at timing point $t_3$, it is determined that the preceding field has been fully and completely recovered and stored. Consequently, there is no need to detect or rely upon the subsequent occurrence of condition 40 to make this same determination.

Likewise, condition 42, similar to condition 41, occurs at timing point $t_7$, but this condition 42 provides no additional information beyond that represented by condition 41. That is, at timing point $t_6$ it is determined that the preceding field (whose field polarity ID bit is "1") has been fully and completely recovered from tape 2, is stored in the frame memories and may be read out to monitor 23 without loss or distortion of any video information. Condition 42 at timing point $t_7$ does not provide additional useful information and, thus, may be neglected.

To improve the accuracy with which the field polarity ID bit is detected, microprocessor 27 may sample the field ID bits included in the simultaneously played sectors a number of times to prevent erroneous detection in the event that the sampled ID bit is not stable and thus fluctuates between a "0" and a "1". That is, the integrity of the field ID data detection operation is improved if a determination is made after such bit is sampled a number of times.

Figure 23:
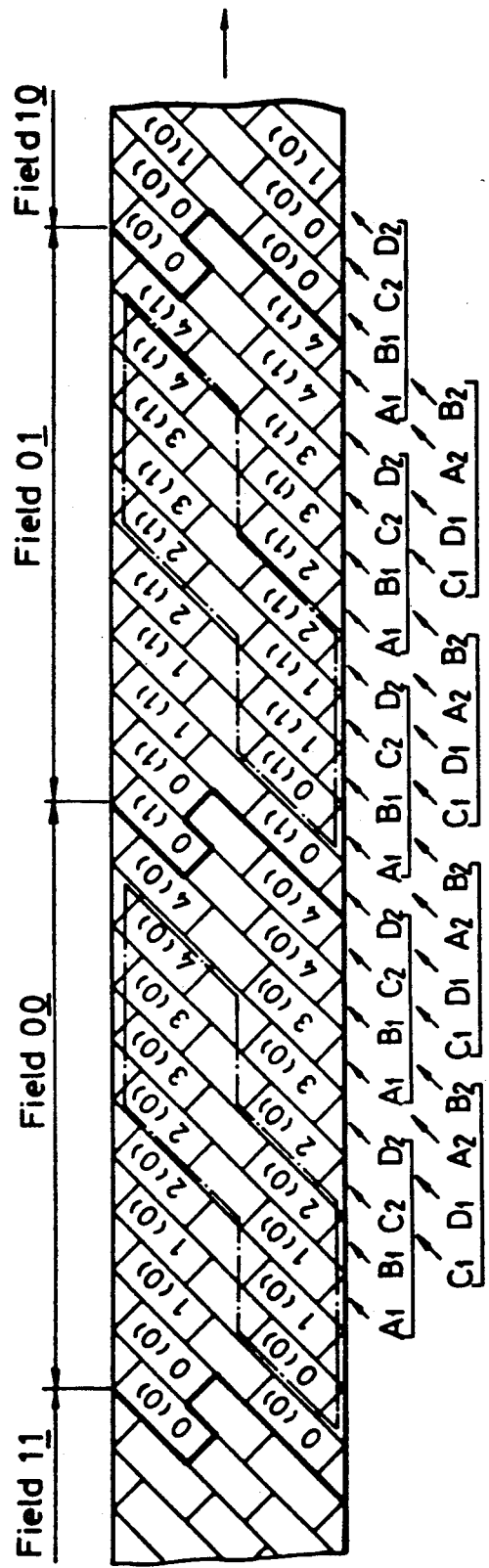
FIG. 23 is another schematic representation of digital video tape recorded in the D-1 format and played back by the embodiment shown in FIGS. 20A-20B.
Figure 24:
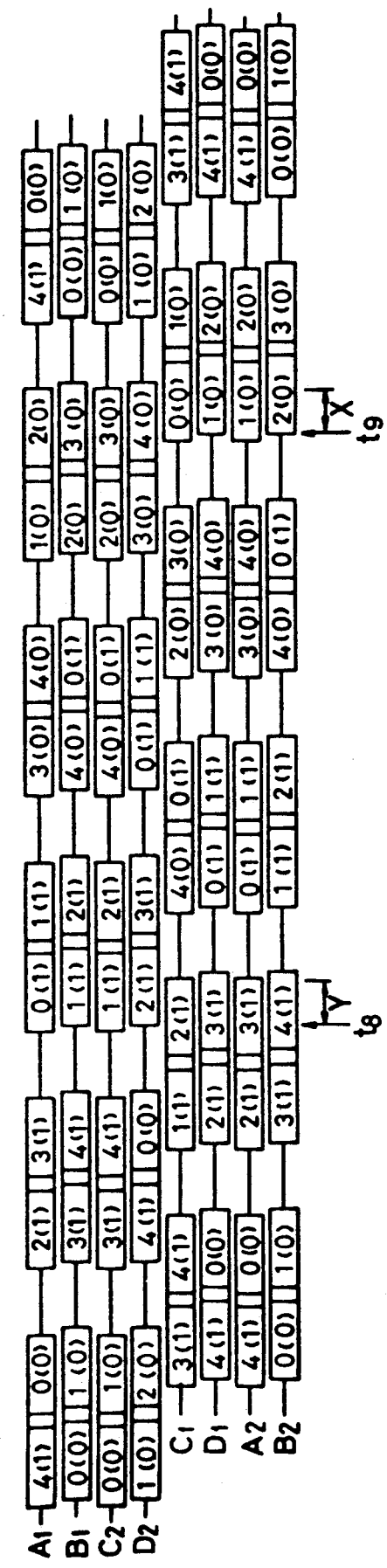
FIG. 24 is another schematic representation of the sectors played back from the digital video tape shown in FIG. 23.

The present invention serves to detect when a preceding field of digital video data has been fully played back and stored in the frame memories regardless of the phase, or positioning, of the heads along the tracks on tape 2. In FIG. 21, it was assumed that heads $A_1$, $B_1$, $C_2$ and $D_2$ initially scan sectors 4(1), 4(1), 0(0) and 0(0), respectively, at the boundary between fields 10 and 01. If, however, the phase of the playback heads is shifted such that heads $A_1$-$D_2$ initially scan sectors 4(1), 0(0), 0(0) and 1(0), respectively, an accurate determination still is made by the present invention as to when a preceding field interval has been fully played back. FIG. 23 illustrates this phase of heads $A_1$-$D_2$ as they initially scan sectors 4(1), 0(0), 0(0) and 1(0) at the boundary between fields 10 and 01. As this set of heads and the set comprised of heads $C_1$, $D_1$, $A_2$ and $B_2$ make successive passes across tape 2, the sectors played back thereby are as shown in FIG. 24. It is appreciated that FIG. 24 provides an accurate representation of the timing relationship of these played back sectors.

During the period Y commencing at timing point $t_8$, all of the sectors simultaneously played back by all of the heads contain the same field polarity ID bit which, in FIG. 24, is shown as a "1". Thus, at timing point $t_8$, all of the sectors included in the preceding field, such as field 10, will have been fully and completely played back and stored in the frame memories. Hence, this stored field may be read out and supplied to monitor 23 at timing point $t_8$.

Likewise, during the period X at timing point $t_9$, all of the sectors simultaneously played back by all of the heads contain the same field polarity ID bit, which is shown in FIG. 24 as a "0". Consequently, at timing point $t_9$, the preceding field 01 will have been fully and completely played back and stored in the frame memories. Therefore, this field 01 may be read out and supplied to monitor 23 at timing point $t_9$, that is, at the time that the microprocessor detects that the field polarity ID data included in all of the sectors now being played back are the same.

Figure 25:
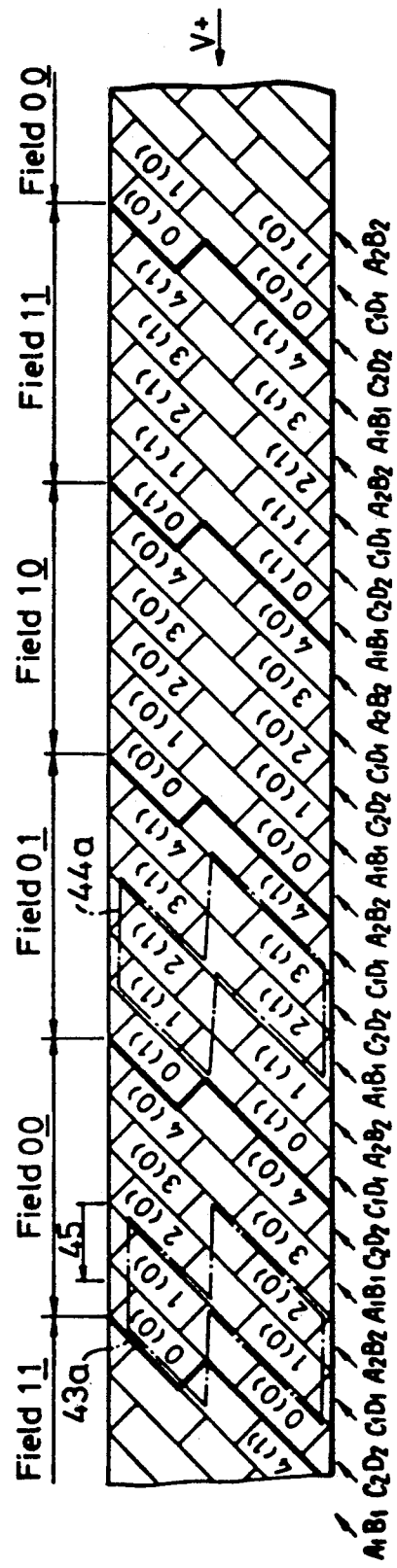
FIG. 25 is another schematic representation of digital video tape recorded in the D-1 format when played back at 2 times normal speed.

Whereas FIGS. 21-24 represent the playing back of sectors $-1.0$ time normal speed, FIG. 25 will be described to point out how the present invention operates when digital video data is played back at $+2.0$ times normal speed. For simplification, FIG. 25 illustrates double tracks which are scanned by pairs of heads. Thus, each field interval is recorded in five double tracks which, of course, constitutes the ten tracks described above. With this in mind, it is assumed that playback heads $A_1$, $B_1$, $C_2$ and $D_2$ initially scan sectors 4(1), 4(1), 0(0) and 0(0), respectively, at the boundary between field 11 and field 00 (it is appreciated that the tape now is scanned in the forward direction). Similarly, the other set of heads $C_1$, $D_1$, $A_2$ and $B_2$ initially scan sectors 1(0), 1(0), 2(0) and 2(0), respectively, of field 00.

At the next pass of heads $A_1$-$D_2$, sectors 3(0), 3(0), 4(0) and 4(0), respectively, in field 00 are played back. It is appreciated that, with each successive pass, the heads scan different tracks as the tape is transported in the forward direction; and this is depicted by its equivalence wherein the heads are moved from left to right. Of course, because of dynamic tracking, the heads are displaced during a scanning operation so as to trace the tracks accurately. Arrow 45 (in field 00) represents the actual deviation of the heads due to this dynamic tracking.

Figure 26:
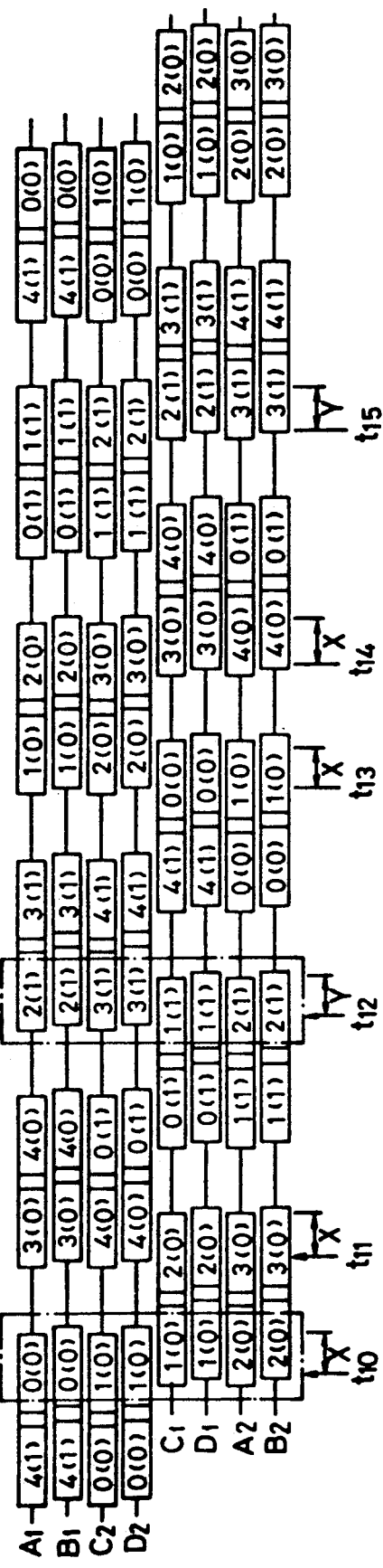
FIG. 26 is a schematic representation of the video sectors which are played back from the video tape shown in FIG. 25 at 2 times normal speed.

FIG. 26 illustrates the sectors which are reproduced by the respective heads in the approximate time relationship at which those sectors are played back when the tape is scanned at $+2.0$ times normal speed. As was discussed in conjunction with FIGS. 21-24, when the field polarity ID data contained in all of the sectors simultaneously played back by all of the heads is the same, it is determined that the preceding field has been fully and completely played back and is stored in the frame memories awaiting read-out to monitor 23. Thus, as shown in FIG. 26, at timing points $t_{10}$ and $t_{13}$, the field polarity ID bit in all of the sectors then being played back from the tape is a "0", thus representing that the preceding odd field (whose field polarity ID bit is a "1") has been fully played back and now may be read out to the monitor. Likewise, at timing point $t_{12}$, the field polarity ID bit contained in all of the sectors then being played back by heads $A_1$-$D_2$ and $C_1$-$B_2$ is a "1". Consequently, it is determined that the preceding even field (all of whose sectors contain the field polarity ID bit "0") now may be read out. That is, when conditions 43 and 44, initiated for the periods X and Y at timing points $t_{10}$ and $t_{12}$, respectively, are sensed, it is determined that the preceding field of digital video data has been fully and completely played back from the tape, has been stored in the frame memories and now may be read out to the monitor. As before, although a similar condition may be present at, for example, timing point $t_{11}$, it may not be necessary to detect this redundant condition and, for the purpose of the present description, that redundant condition is ignored.

Conditions 43 and 44 in FIG. 26 correspond to head positions 43a and 44a, respectively, as shown in FIG. 25. It is appreciated that, in these respective head positions, digital video data of the preceding field no longer is played back. Thus, such preceding field will have been fully and completely reproduced from the tape by the time head position 43a or 44a is reached.

In the examples described above in conjunction with FIGS. 21-26, the field ID data contained in each sector played back simultaneously by all of the heads is examined by detecting the field ID data which is written into the frame memories. Alternatively, rather than detecting the field ID that has already been written into the memories, the field ID data may be detected as it is being supplied to the frame memories for a write-in operation. As yet another alternative, the field ID data contained in each sector then being written into the frame memories, or in each sector which has just been written thereinto, may be examined successively to determine when all of the sectors which are reproduced from the tape during the same pass of the heads thereacross is equal. For example, the field ID data written into the frame memories from head $A_1$ may be examined, followed by the field ID data written from head $B_1$, followed by the field ID data written from head $C_2$, and so on. When the field ID data from all of the heads during one pass is the same, it is determined that the preceding field had been fully and completely played back, is stored in the frame memories and now may be read out.

As yet another alternative, the field ID data which is detected by the microprocessor in accordance with the present invention may, in fact, be frame ID data. Thus, rather than detect the least significant bit of the field ID pattern, both bits of that pattern may be sensed. Alternatively, the more significant bit may be detected, thus sensing frame 1 (fields 10 and 11) or frame 0 (fields 01 and 00). Hence, the present invention may be employed to sense when a preceding frame of digital video data has been fully played back and stored in the frame memories, and thus may be read out therefrom.

Another embodiment of the present invention is illustrated in FIG. 27. In this embodiment, digital video data recorded in the D-1 format on video tape 102 is played back by sets of multiple heads, such as the sets illustrated in FIG. 6. For convenience, only one channel of the playback circuitry is illustrated in FIG. 27 associated with only one playback head 120.

Head 120 is coupled to a timebase corrector which includes a phase locked loop 121 and which produces corrected digital data DX. The reproduced sectors of digital video data which comprise data DX are illustrated in FIG. 28A. These sectors are written into predetermined addresses of memory 122 in the same sequential order as they are recorded. Thus, as head 120 plays back sectors a1 and b1, these sectors are written into the memory in that same order. Likewise, sectors a2 and b2 are written into the memory in the same order as they are recorded, and so on. These sectors are, of course, illustrated in FIGS. 21-26. It is appreciated that the area which separates the sectors of FIG. 28A represents audio information as recorded in the D-1 format.

An address converting circuit 123 is coupled to memory 122 to read out from the memory the sectors which had been written into the aforementioned predetermined addresses, but such sectors are read out in reverse order. The data DY read from memory 122 in reverse order is illustrated in FIG. 28B. Thus, whereas sectors a1 and b1 were written into memory 122 in sequence, these sectors are read from the memory in reverse sequence b1, a1 as shown in FIG. 28B. Likewise, sector sequence a2, b2 included in data DX is read from the memory as data DY in reverse sequence b2, a2. Thus, as pairs of sectors are written into the memory in the respective sequences shown in FIGS. 21-26, each pair is read from the memory in reverse order.

Memory 122 need not be provided specifically for the purpose of reversing the orders of sectors which are played back from tape 102. Rather, the memory may be included in the same timebase corrector as phase locked loop 121.

Figures 10, 11:
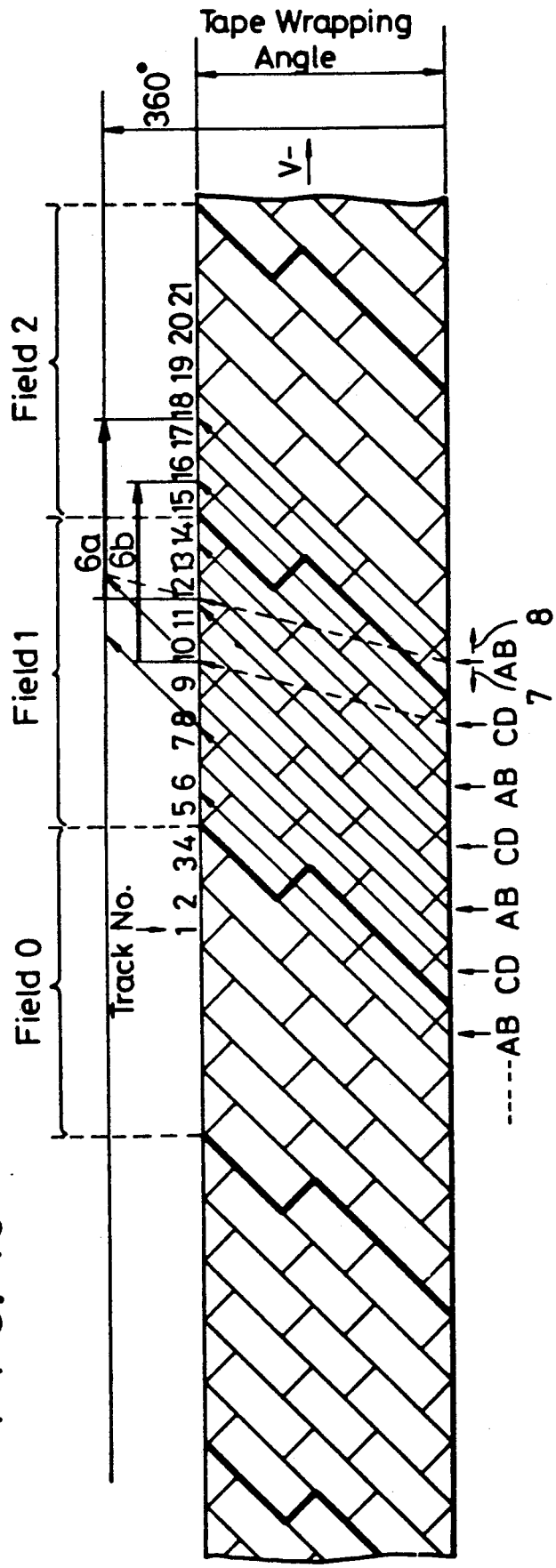
FIG. 10 is a schematic representation of reverse scanning by the example shown in FIG. 1 of digital video tape that had been recorded in D-1 format.
FIG. 11 is a schematic representation of the sequence in which the fields are played back from the video tape shown in FIG. 10 during a reverse mode.
Figure 13:
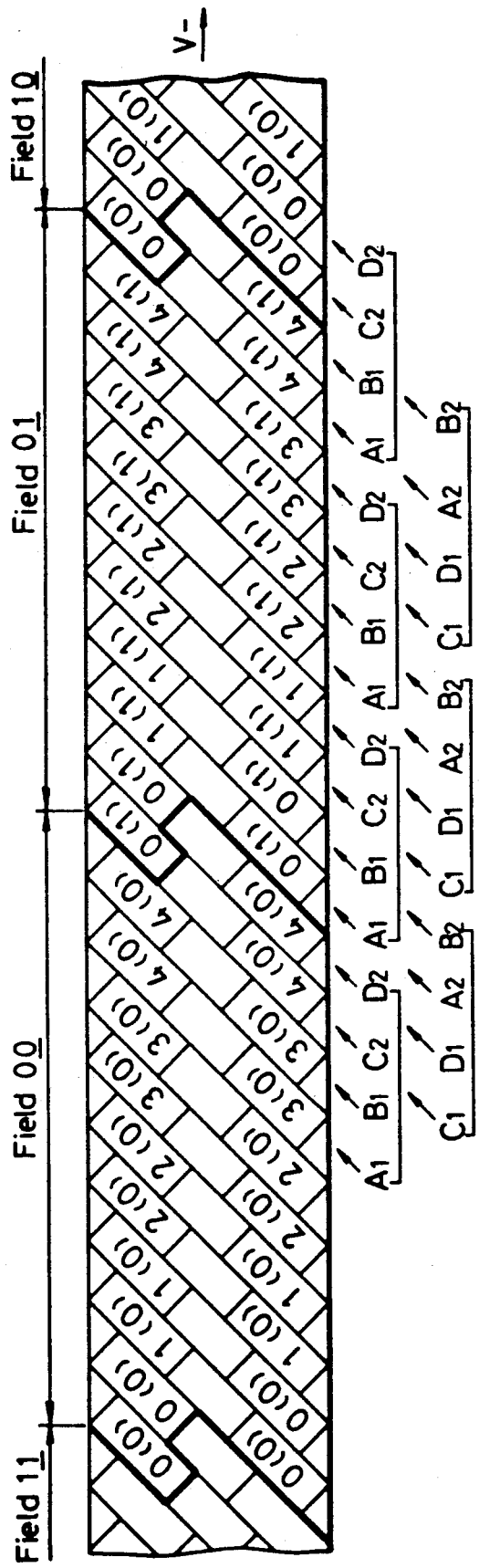
FIG. 13 is a schematic representation of digital video tape recorded in the D-1 format scanned in the reverse mode by the example shown in FIG. 6.
Figure 14:
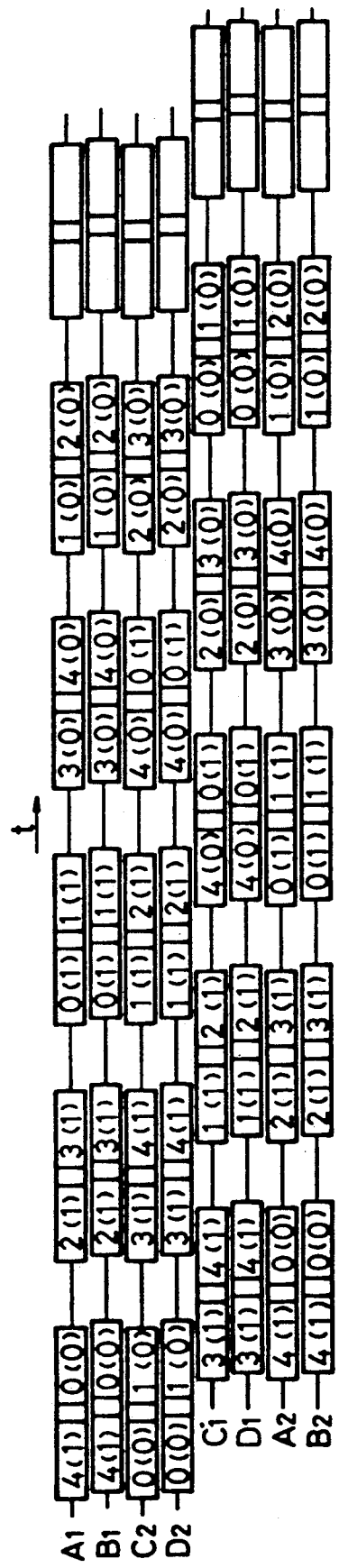
FIG. 14 is a schematic representation of the sectors which are reproduced from the video tape of FIG. 13.
Figure 15:
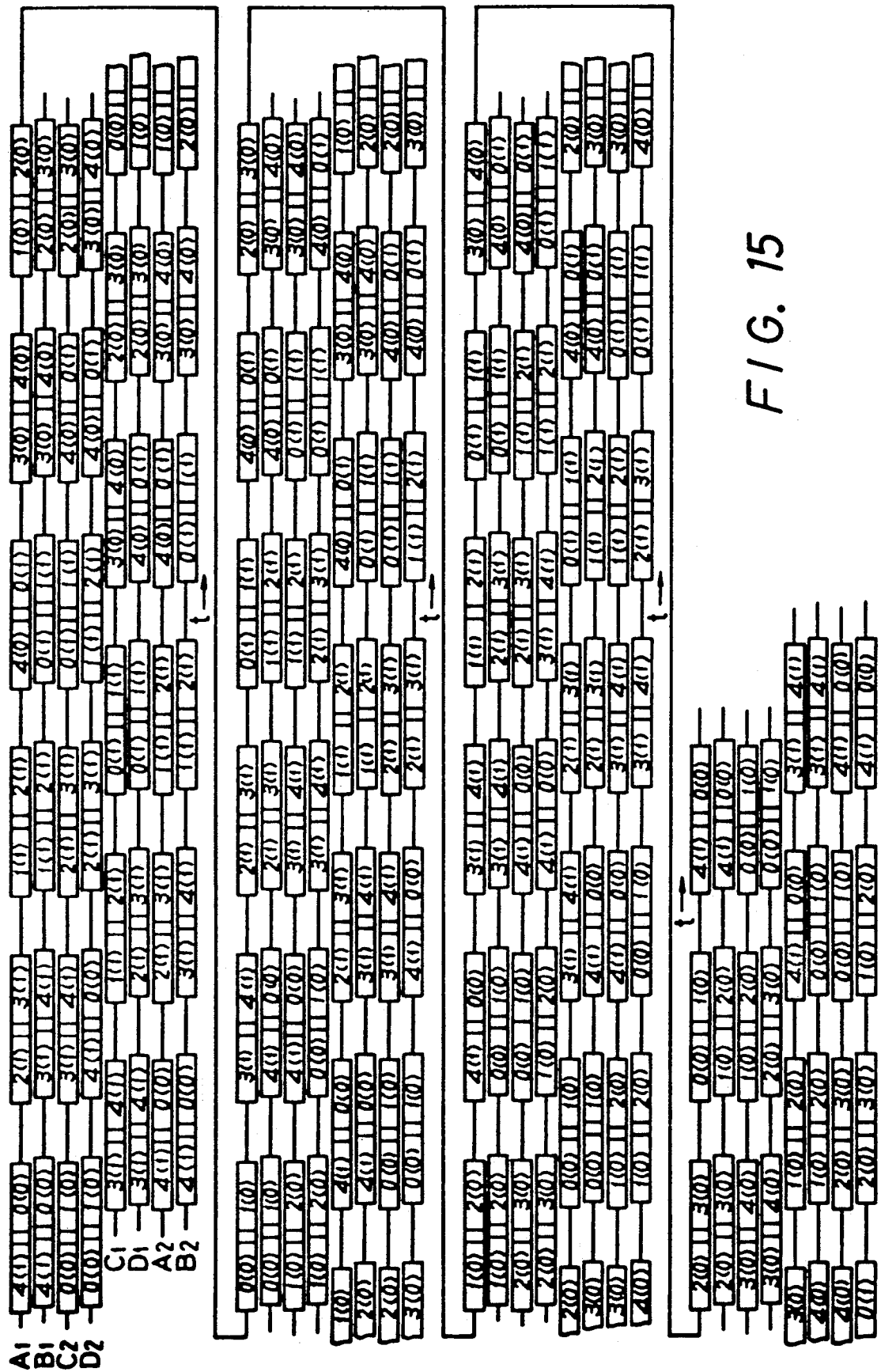
FIG. 15 is a schematic representation of the sectors reproduced from the video tape shown in FIG. 13 when that tape is played back at −0.75 times normal speed.
Figure 16:
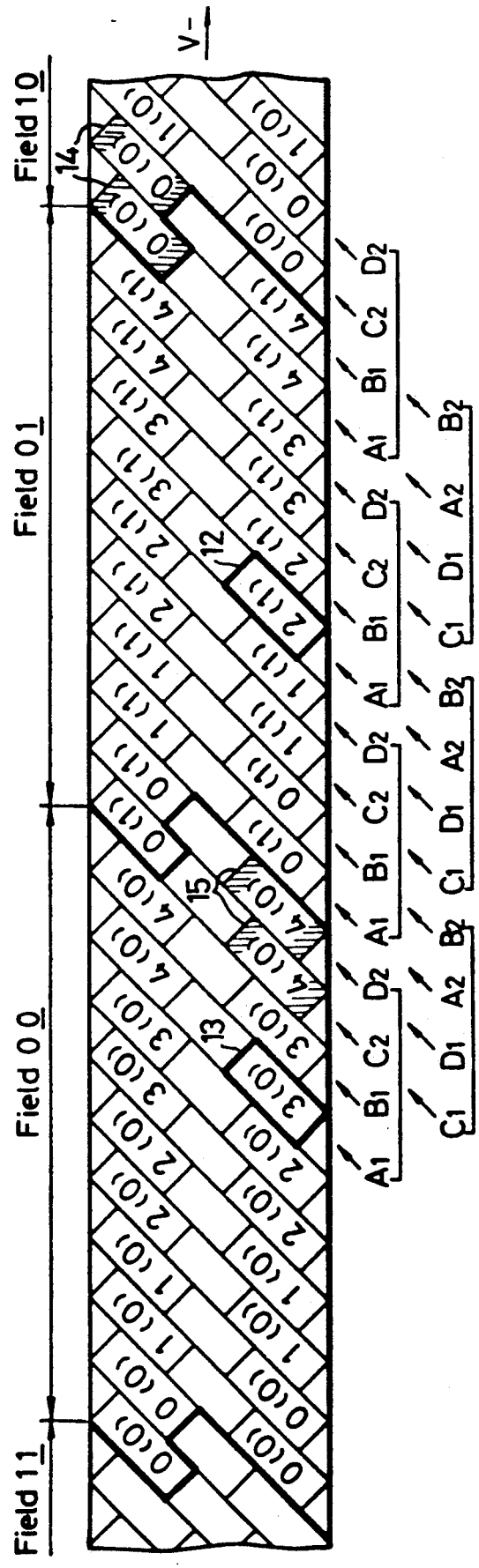
FIG. 16 is another schematic representation of digital video tape recorded in D-1 format and played back at −1.0 normal speed by the example shown in FIG. 6.
Figure 17:
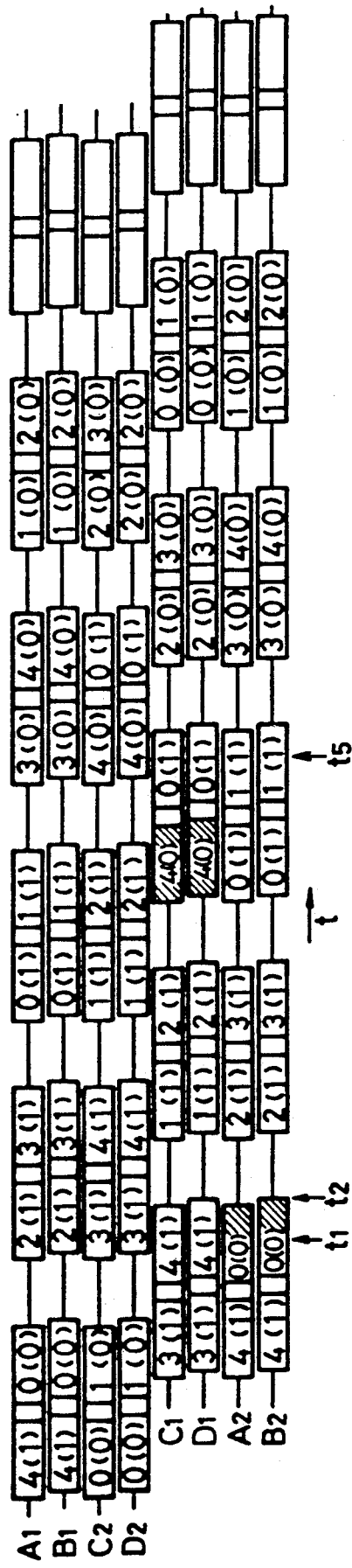
FIG. 17 is another schematic representation of the sectors which are played back from the video tape shown in FIG. 16 and which is useful in understanding the problems solved by the present invention.

Preferably, address converting circuit 123 operates to reverse the order of these sectors read from memory 122 only during reverse playback modes of tape 102. From the previous discussion of FIG. 10, it is recalled that the reverse phenomenon, that is, the playing back of sectors from alternate fields when the heads pass from one field to the next, occurs only when the video tape is played back in a reverse mode. Such reverse phenomenon does not occur when the video tape is played back in a forward mode. Thus, to overcome the problem of reverse phenomenon, address converting circuit 123 is actuated to reverse the order of the sectors read from memory 122 only when tape 102 is played back in a reverse mode.

Data DY read from memory 122 is supplied to an extracting circuit 124 which extracts the synchronizing and identification patterns included in the preamble (shown in FIG. 2B) of each sector. The remaining synchronizing blocks are supplied to a field memory 126 via an inner code error correcting circuit 125. The inner code error correcting circuit and field memory preferably are as described previously with respect to FIGS. 20A and 20B.

After being written into field memory 126, all of the sectors which comprise a complete field are read therefrom and supplied to a monitor 130 by way of an outer code error correcting circuit 127, an error correcting circuit 128 and a D/A converter 129. Circuits 127, 128 and 129 may be similar to the outer code error correcting circuit 26b (or 28b), error correcting circuit 31 and D/A converter 32, discussed previously with respect to FIGS. 20A and 20B. Preferably, field memory 126 exhibits a storage capacity on the order of three field periods and, therefore, the field memory may be divided into storage areas which, for convenience, are referred to as field memories A, B and C, respectively.

Figure 2B:
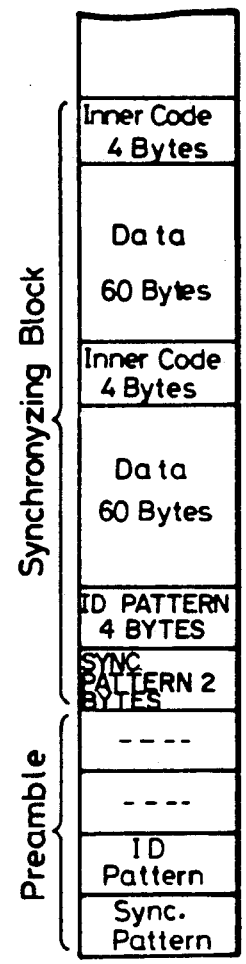
Figure 2C:
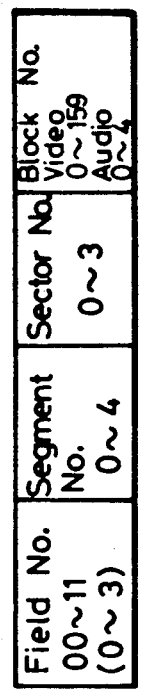
Figure 4:
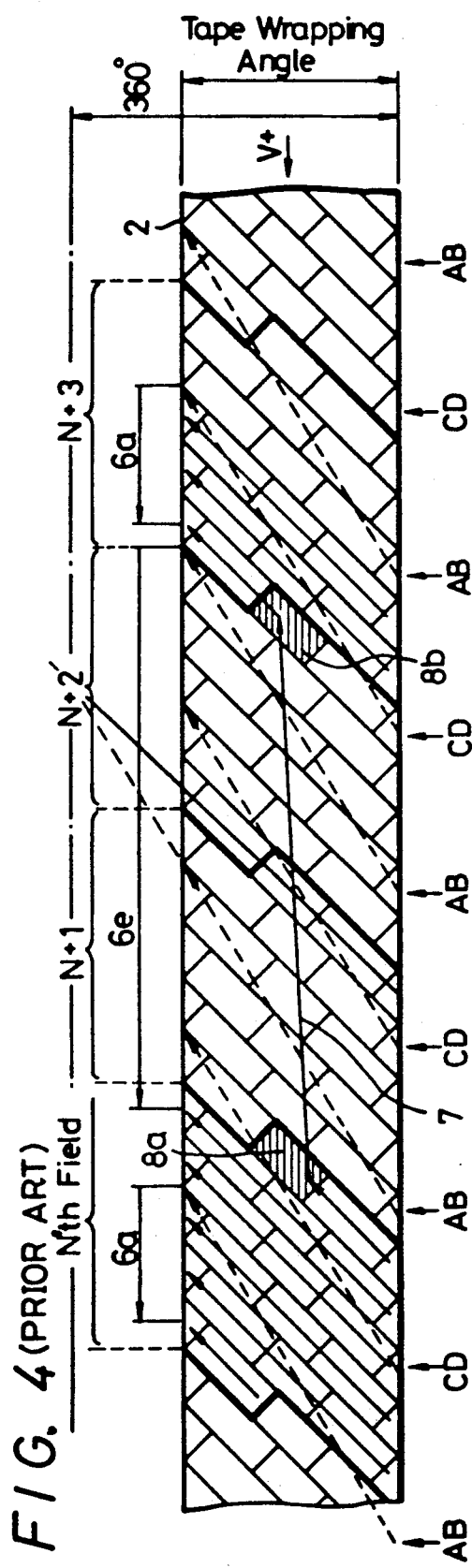
FIGS. 4 and 5 are schematic representations of scanning operations carried out by the example shown in FIG. 1 on digital video tape recorded in the D-1 format.
Figure 5:
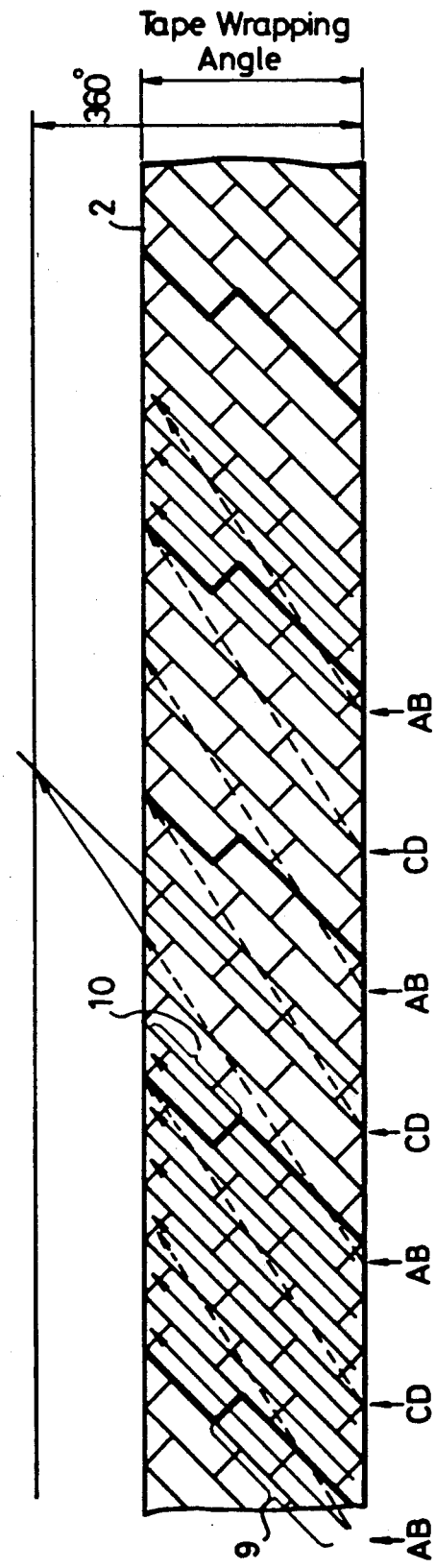

To best appreciate the operation of the embodiment shown in FIG. 27, let it be assumed that the digital video data recorded on tape 102 is played back at −0.75 times normal speed. From the previous discussion of FIGS. 10-12, it is recalled that, during this reverse playback mode, it is expected that when the sectors recorded at the boundary between adjacent fields are played back, the played back sectors alternate between one field and the next preceding field as shown in FIGS. 12A-12D. However, by re-ordering the sequence of the sectors read from memory 122, this reverse phenomenon is avoided. For example, and with reference to FIG. 10, if tracks 15, 16 in field 2 are scanned, the last sector included in field 1 followed by the first sector included in field 2 are written into memory 122. However, this order is reversed when the sectors are read from the memory and, thus, the first sector in field 2 followed by the last sector in field 1 are read. As a result, the alternation between fields when the tape is read in a reverse mode, such as the alternations shown in FIGS. 12A-12D, is avoided. FIGS. 29A-29E illustrate a stable pattern of monotonic reproduction of fields even when tape 102 is played back in a reverse mode. As compared to FIGS. 12A-12D, there is no alternation between fields when the heads cross the boundary from one field to the next preceding field. Of course, since the identity of each sector is determined from the 4-byte ID pattern included in each synchronizing block (as shown in FIGS. 2B and 2C), the sectors are processed easily and directly whether tape 102 is played back in a forward mode or in a reverse mode. It is appreciated that the reverse phenomenon is avoided when the embodiment of FIG. 27 is used.

FIG. 30A represents the sequence in which fields 2, 1 and 0 are played back by the embodiment of FIG. 27 when tape 102 is driven in the reverse mode. FIG. 30A illustrates the absence of reverse phenomenon. FIG. 30B represents the field memories into which the played back fields are written. Thus, field 2 is written into field memory A, field 1 is written into field memory B and field 0 is written into field memory C. At −0.75 times normal speed, FIGS. 30C-30E represent the timing sequence at which these field memories are read to supply the fields of digital video data to monitor 130.

When the embodiment of FIG. 27 is used, tape 102 may be played back in, for example, the reverse mode at any speed between −1.0 times normal speed and 0 times normal speed, without the ambiguity of determining whether or not a previous field had been fully played back and stored in a field memory. Rather, when this embodiment is used, it is easily determined that, when common field ID data is detected, the previous field which had been played back from the tape has, in fact, been played back in its entirety. In the embodiment represented by FIGS. 31 and 32, rather than reversing the order of the sectors which are read from memory 122 when the video tape is played back in a reverse mode, the heads may be controlled so as to perform a track-jump equal to two tracks after the first sector in that track has been played back. Such a track-jump operation may be effected easily by the bimorph supports used for dynamic tracking.

For example, when tape 2 of FIG. 31 is played back at −0.75 times normal speed, rather than scanning along trace 33 (shown in broken lines), the heads are dynamically controlled to scan the zig-zag track 32. Let it be assumed that field 01 is being played back. Let it be further assumed that heads $A_1$, $B_1$, $C_2$ and $D_2$ initially scan sectors 1(1), 1(1), 2(1) and 2(1), respectively. After these sectors are played back, the bimorph support upon which heads $A_1$, $B_1$, $C_2$ and $D_2$ are mounted is energized to displace these heads by two tracks to play back sectors 1(1), 1(1), 2(1) and 2(1), respectively. Heads $C_1$-$B_2$ are similarly controlled. As a result, the two sets of heads play back the sectors shown in FIG. 32 having the time relationship illustrated therein.

Accordingly, by reason of this track-jump, the time at which a field of digital video data has been fully and completely played back and stored in a field memory may be easily determined. The occurrence of conditions 39 and 41 (shown in FIG. 22) or conditions 43 and 44 (shown in FIG. 26) may be detected easily, from which it is determined that a preceding field has been fully played back and may be supplied to a monitor. It will be recognized that the track-jumping operation shown in FIG. 31 serves to modify the sequence, or order, in which sectors are written into a field memory in much the same way as the embodiment shown in FIG. 27 modifies that sequence.

While the present invention has been particularly shown and described with reference to preferred embodiments, it will be readily appreciated by those of ordinary skill in the art that various changes and modifications may be made without departing from the spirit and scope of the invention. For example, and as has been discussed above, the memory device or devices used in FIG. 20A may be thought of as being divided into three field memory sections. The present invention makes it unnecessary to provide memory capacity greater than three field intervals.

In FIG. 27, the particular location of memory 122 may be varied from that shown in the drawing. In fact, this memory may be disposed at any location in the series circuit represented by "X" and still effect a reversal in the order of sectors being supplied to field memory 126.

It is intended that the appended claims be interpreted as covering the particular embodiments specifically described herein, the alternatives which have been discussed throughout and all equivalents thereto.

What is claimed is:

1. A method of recovering digital video data recorded in D-1 format from a record medium, wherein said video data is recorded in successive block units with each block unit comprised of several segments recorded in plural tracks and each segment includes unit identifying data, said method comprising the steps of scanning the tracks with plural sets of reproducing heads to reproduce plural segments concurrently from plural tracks by said plural sets of reproducing heads; detecting when the unit identifying data in segments reproduced by all of the reproducing heads in said plural sets includes common unit identification; and determining that all of the segments of a preceding block unit have been reproduced from the record medium when said common unit identification is detected in the segments reproduced by all of said reproducing heads.

2. The method of claim 1 wherein a block unit comprises a video field and said unit identifying data comprises field ID data.

3. The method of claim 2 wherein said field ID data determines if a video field is an odd field or an even field.

4. The method of claim 3 wherein said common unit identification comprises the same odd/even field ID data.

5. The method of claim 1 wherein a block unit comprises a video frame and said unit identifying data comprises frame ID data.

6. The method of claim 5 wherein said common unit identification comprises the same frame ID data.

7. The method of claim 1 wherein said step of scanning comprises making successive passes over said record medium with said plural sets of reproducing heads; and said step of detecting comprises sensing said unit identifying data reproduced during a substantially common pass of said plural sets of reproducing heads over said record medium.

8. The method of claim 7 wherein said record medium comprises magnetic tape, said plural sets of reproducing heads comprise two sets of spaced apart rotary heads, each set including plural heads, and said step of scanning includes rotating both sets of heads across said magnetic tape such that both sets are in magnetic contact with said tape during the same pass.

9. The method of claim 7 wherein each segment is comprised of plural sectors recorded in different tracks, with each sector containing unit identifying data and with some sectors from different segments being recorded in the same track and separated by other data; and wherein said step of detecting further comprises writing each sector of digital video data into memory means such that unit identifying data stored in said memory means is sensed.

10. The method of claim 9 further comprising the step of reading from said memory means all sectors that had previously been written therein with common unit identification of one type when the sectors presently being written into said memory means contain common unit identification of another type.

11. The method of claim 10 wherein a block unit comprises a video field, said unit identifying data includes polarity ID data which identifies the field as at least odd or even, and wherein all sectors of a field of one type polarity previously written into said memory means are read out when the polarity ID data presently written into said memory means from all of said reproducing heads identifies the field being written therein as the other type of polarity.

12. Apparatus for reproducing digital video signals from a record medium on which said digital video signals are recorded in a format such that a block unit of video signals is comprised of several segments recorded in plural tracks with each segment containing unit identifying data, said apparatus comprising: plural playback heads for scanning said record medium in successive passes to play back the digital video signals recorded in segments in tracks scanned thereby; memory means for storing digital video signals recovered from said record medium; detecting means for detecting the unit identifying data in each segment played back from said record medium and for determining when the unit identifying data in segments played back simultaneously by all of said playback heads identifies the same block unit; and read-out means responsive to said detecting means for reading out from said memory means the digital video signals included in a block unit that was played back prior to the playing back of the block unit whose identity presently is determined by said detecting means.

13. The apparatus of claim 12 wherein said block unit is a field interval of video signals.

14. The apparatus of claim 13 wherein the format in which said digital video signals are recorded is the D-1 format.

15. The apparatus of claim 13 wherein each segment of a field of video signals is comprised of plural sectors with some sectors from different segments being recorded in the same track and spaced longitudinally from each other by non-video data, each sector including field identifying data.

16. The apparatus of claim 15 wherein said plural playback heads comprise two sets of playback heads, each set including at least two heads for scanning said record medium such that during one pass of said playback heads, all of the heads in said two sets play back sectors concurrently.

17. The apparatus of claim 13 wherein said unit identifying data includes polarity ID data which identifies the field interval as at least odd or even; and wherein said detecting means includes ID data sense means coupled to said memory means for sensing polarity ID data in segments played back by said playback heads and being written into said memory means to determine when all of the segments then being written into said memory means include the same polarity ID data.

18. The apparatus of claim 17 wherein said read-out means includes means for reading out from said memory means those segments stored therein which include polarity ID data opposite that sensed by said sense means.

19. Apparatus for detecting when a block unit of digital video signals that have been recorded on a record medium in D-1 format with different sectors of the block unit recorded in respective tracks and containing unit identifying data are fully played back from said record medium, comprising plural sets of playback heads for scanning said tracks, each set being comprised of multiple heads and all of said heads simultaneously playing back at least a portion of different sectors; detecting means for detecting the unit identifying data included in the different sectors simultaneously played back by said heads; and determining means for determining when the unit identifying data included in the different sectors simultaneously played back by said heads identifying the same block unit; and means for supplying to further apparatus a block unit of digital video signals that had been played back previously and whose segments contain unit identifying data different from that contained in the sectors simultaneously played back by said heads.

20. The apparatus of claim 19 wherein said block unit is a field interval of video signals.

21. The apparatus of claim 20 wherein said unit identifying data includes polarity ID data which identifies the field interval as even or odd, and said detecting means is operable to detect the polarity ID data included in the different sectors simultaneously played back by said heads; and wherein said determining means supplies to further apparatus a previously played back field interval of polarity opposite the polarity detected by said detecting means.

22. The apparatus of claim 21 further including storage means for storing sectors played back by said heads, and read-out means responsive to said determining means for reading out stored sectors containing polarity ID data opposite the polarity ID data detected by said detecting means.

23. The apparatus of claim 19, further comprising means for playing back the digital video signals from said record medium in a reverse mode.

24. The apparatus of claim 19, further comprising dynamic tracking means for supporting each set of playback heads.

25. The apparatus of claim 24 wherein said dynamic tracking means comprises plural bimorph support means, each for supporting a respective set of playback heads.

26. The apparatus of claim 24 wherein each track contains a pair of longitudinally spaced sectors derived from different segments of a video picture represented by said digital video signals; and wherein said dynamic tracking means is operative to impart a track jump to a set of playback heads after said set plays back first sectors in respective tracks, whereby said heads trace a zig-zag pattern across said record medium.

27. The apparatus of claim 23 wherein each playback head plays back a sequence of sectors in a given order from the track scanned thereby; and further including means for reversing the order of the sectors played back from said track.

28. The apparatus of claim 27 wherein said last-mentioned means includes memory means for temporarily storing a sequence of sectors played back from said track, write address means for generating write-in addresses of said memory means into which said played back sequence of sectors is written, and read address means for generating read-out addresses which are in an order that is the reverse of that of said write-in addresses to read the sequence of sectors from said memory means in reverse order.

* * * * *